US011562149B2

(12) United States Patent
Jawale et al.

(10) Patent No.: US 11,562,149 B2
(45) Date of Patent: *Jan. 24, 2023

(54) DETERMINING CONVERSATIONAL STRUCTURE FROM SPEECH

(71) Applicant: Rammer Technologies, Inc., Seattle, WA (US)

(72) Inventors: Toshish Arun Jawale, Seattle, WA (US); Ansup Babu, Balangir (IN); Anthony Claudia, Boulder, CO (US)

(73) Assignee: Rammer Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,274

(22) Filed: Jun. 13, 2022

(65) Prior Publication Data

US 2022/0309252 A1    Sep. 29, 2022

Related U.S. Application Data

(63) Continuation of application No. 17/389,145, filed on Jul. 29, 2021, now Pat. No. 11,361,167, which is a
(Continued)

(51) Int. Cl.
*G06F 40/35* (2020.01)
*G06F 40/289* (2020.01)

(52) U.S. Cl.
CPC ............ *G06F 40/35* (2020.01); *G06F 40/289* (2020.01)

(58) Field of Classification Search
CPC ................................ G06F 40/35; G06F 40/289
(Continued)

(56) References Cited

U.S. PATENT DOCUMENTS 7,814,048 B2 * 10/2010 Zhou ....................... H04L 51/04
                                                  707/723
8,577,671 B1 * 11/2013 Barve ..................... G06F 40/30
                                                  715/752
(Continued)

FOREIGN PATENT DOCUMENTS

CN          111191450 A       5/2020

OTHER PUBLICATIONS

Office Communication for U.S. Appl. No. 17/246,495 dated Jun. 28, 2021, pp. 1-26.
(Continued)

*Primary Examiner* — Edwin S Leland, III
(74) *Attorney, Agent, or Firm* — John W. Branch; Branch Partners PLLC

(57) ABSTRACT

Embodiments are directed to organizing conversations. Words may be provided from a conversation stream. Each word may be mapped to a graph model based on characteristics of each word. The graph model may be partitioned based on one or more attributes of a nodes and edges included in the graph model such that nodes associated with relationship strength that exceeds a threshold value may be grouped together. Sentence models may be generated based on sentences included in the conversation stream. Combined models may be generated based on the sentence models and the graph such that each sentence model may be associated with one or more partitions of the graph model. A conversation digest may be generated based on the combined model such that the conversation digest identifies one or more dominant portions of the conversation that include key subject matter.

20 Claims, 14 Drawing Sheets

Related U.S. Application Data continuation of application No. 17/246,463, filed on Apr. 30, 2021, now Pat. No. 11,093,718.

(60) Provisional application No. 63/119,957, filed on Dec. 1, 2020.

(58) Field of Classification Search
USPC .......................................................... 704/9
See application file for complete search history.

(56) References Cited

U.S. PATENT DOCUMENTS

| | | | |
|---|---|---|---|
| 9,201,927 B1* | 12/2015 | Zhang | G06F 40/30 |
| 9,367,608 B1* | 6/2016 | Zhang | G06F 16/3331 |
| 10,754,883 B1* | 8/2020 | Kannu | G06F 16/36 |
| 11,093,718 B1* | 8/2021 | Jawale | G06F 40/35 |
| 11,132,988 B1* | 9/2021 | Steedman Henderson | G06K 9/6277 |
| 11,263,407 B1* | 3/2022 | Jawale | G06F 3/0481 |
| 2004/0243388 A1* | 12/2004 | Corman | G06F 40/211 704/1 |
| 2005/0278325 A1* | 12/2005 | Mihalcea | G06F 40/284 |
| 2007/0156625 A1* | 7/2007 | Visel | G06N 3/02 706/62 |
| 2013/0046531 A1* | 2/2013 | Chandramouli | G06F 40/216 704/9 |
| 2015/0006155 A1* | 1/2015 | Tanigaki | G06F 40/40 704/9 |
| 2015/0032441 A1* | 1/2015 | Marcus | G06F 40/211 704/9 |
| 2015/0095770 A1* | 4/2015 | Mani | G06F 40/12 715/254 |
| 2015/0186504 A1* | 7/2015 | Gorman | G06F 40/30 707/752 |
| 2015/0286629 A1* | 10/2015 | Abdel-Reheem | G06F 40/295 704/9 |
| 2016/0179945 A1* | 6/2016 | Lastra Diaz | G06F 16/284 707/739 |
| 2016/0306791 A1* | 10/2016 | Allen | G06F 16/3329 |
| 2016/0316059 A1* | 10/2016 | Nuta | G10L 15/26 |
| 2017/0053206 A1* | 2/2017 | Kala | G06N 5/025 |
| 2017/0212884 A1* | 7/2017 | Kim | G06F 40/40 |
| 2017/0249668 A1* | 8/2017 | Delort | G06Q 30/0277 |
| 2017/0270096 A1* | 9/2017 | Sheafer | G06F 40/295 |
| 2017/0277781 A1* | 9/2017 | Deolalikar | G06F 16/345 |
| 2017/0316777 A1* | 11/2017 | Perez | G06F 40/35 |
| 2018/0165554 A1* | 6/2018 | Zhang | G06K 9/6256 |
| 2018/0351899 A1* | 12/2018 | Kano | G06F 40/00 |
| 2018/0373696 A1* | 12/2018 | Terry | G06N 20/00 |
| 2019/0005329 A1* | 1/2019 | Misra | G06F 16/367 |
| 2019/0042988 A1* | 2/2019 | Brown | G06N 5/022 |
| 2019/0294668 A1* | 9/2019 | Goel | H04N 21/4788 |
| 2019/0332668 A1* | 10/2019 | Wang | G06N 3/0472 |
| 2019/0378513 A1* | 12/2019 | Carnevale | G06F 40/284 |
| 2019/0384813 A1* | 12/2019 | Mahmoud | G06F 40/289 |
| 2020/0004517 A1* | 1/2020 | Legler | G06F 8/4442 |
| 2020/0005117 A1* | 1/2020 | Yuan | G06F 40/30 |
| 2020/0110943 A1* | 4/2020 | Gunawardena | G06V 20/47 |
| 2020/0143115 A1* | 5/2020 | Brigham | G06N 3/006 |
| 2020/0243094 A1* | 7/2020 | Thomson | H04M 3/42382 |
| 2020/0279017 A1* | 9/2020 | Norton | G06F 16/36 |
| 2021/0004443 A1* | 1/2021 | Sapugay | G06F 16/24556 |
| 2021/0042467 A1* | 2/2021 | Liu | G06F 40/205 |
| 2021/0104014 A1* | 4/2021 | Kolb, V. | G06T 5/20 |
| 2021/0374677 A1* | 12/2021 | Michels | G06Q 10/107 |

OTHER PUBLICATIONS

Office Communication for U.S. Appl. No. 17/246,463 dated Jul. 1, 2021, pp. 1-9.
Office Communication for U.S. Appl. No. 17/246,463 dated Jul. 8, 2021, pp. 1-6.
Office Communication for U.S. Appl. No. 17/246,495 dated Oct. 12, 2021, pp. 1-29.
Office Communication for U.S. Appl. No. 17/389,145 dated Nov. 30, 2021, pp. 1-9.
Office Communication for U.S. Appl. No. 17/246,495 dated Jan. 5, 2022, pp. 1-29.
Office Communication for U.S. Appl. No. 17/523,355 dated Feb. 3, 2022, pp. 1-11.
Office Communication for U.S. Appl. No. 17/523,355 dated Mar. 1, 2022, pp. 1-8.
Office Communication for U.S. Appl. No. 17/389,145 dated Mar. 10, 2022, pp. 1-10.
Office Communication for U.S. Appl. No. 17/523,355 dated Mar. 16, 2022, pp. 1-9.
Office Communication for U.S. Appl. No. 17/717,055 dated Jun. 13, 2022, pp. 1-30.
Office Communication for U.S. Appl. No. 17/682,682 dated Jul. 7, 2022, pp. 1-28.
Siddiqui, Nadia et al., "ConVisQA: A Natural Language Interface for Visually Exploring Online Conversations," 2020 24th International Conference Information Visualisation (IV), 2020, pp. 440-447.
Vilhjálmsson, Hannes Högni, "Augmenting Online Conversation through Automated Discourse Tagging," In Proceedings of the 38th Annual Hawaii International Conference on System Sciences, Jan. 2005, pp. 1-10.

* cited by examiner

DETERMINING CONVERSATIONAL STRUCTURE FROM SPEECH

CROSS-REFERENCE TO RELATED APPLICATIONS

This Utility Patent Application is a Continuation of U.S. patent application Ser. No. 17/389,145 filed on Jul. 29, 2021, now U.S. Pat. No. 11,361,167 issued on Jun. 14, 2022, which is a Continuation of U.S. patent application Ser. No. 17/246,463 filed on Apr. 30, 2021, now U.S. Pat. No. 11,093,718 issued on Aug. 17, 2021, which is based on previously filed U.S. Provisional Patent Application No. 63/119,957 filed on Dec. 1, 2020, the benefit of the filing date of which are hereby claimed under 35 U.S.C. § 119(e) and § 120 and the contents of which are each further incorporated in entirety by reference.

TECHNICAL FIELD

The present invention relates generally to processing natural language speech, and more particularly, but not exclusively to, determining conversational structure from speech.

BACKGROUND

Machine processing or analysis of conversational speech is becoming increasing important to organizations. Accordingly, organizations may endeavor to capture or analyze speech generated during private/internal meetings, public presentations, customer interactions, or the like. Conventionally, organizations may employ machine transcription services, human transcription services, or hybrid machine-human transcription services to transform natural speech into text suitable for machine analysis, processing, or indexing. Accordingly, organizations may develop databases, search engines, or the like, that enable users to perform analysis of the contents of the captured speech, such as, word/phrase identification (e.g., searching), context free statistical analysis (e.g., word counts, word distributions, or the like), and so on. In some cases, organizations may devote significant resources to train or attempt to train machine learning models that may provide additional insights about conversations. However, the variations in speech patterns, mid-conversation context switches, domain specific vocabulary, cultural specific vocabulary, varying number of speakers in one conversations, or the like, may make it prohibitively expensive or impossible to train the machine learning models necessary for gaining additional insights from capture conversations. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
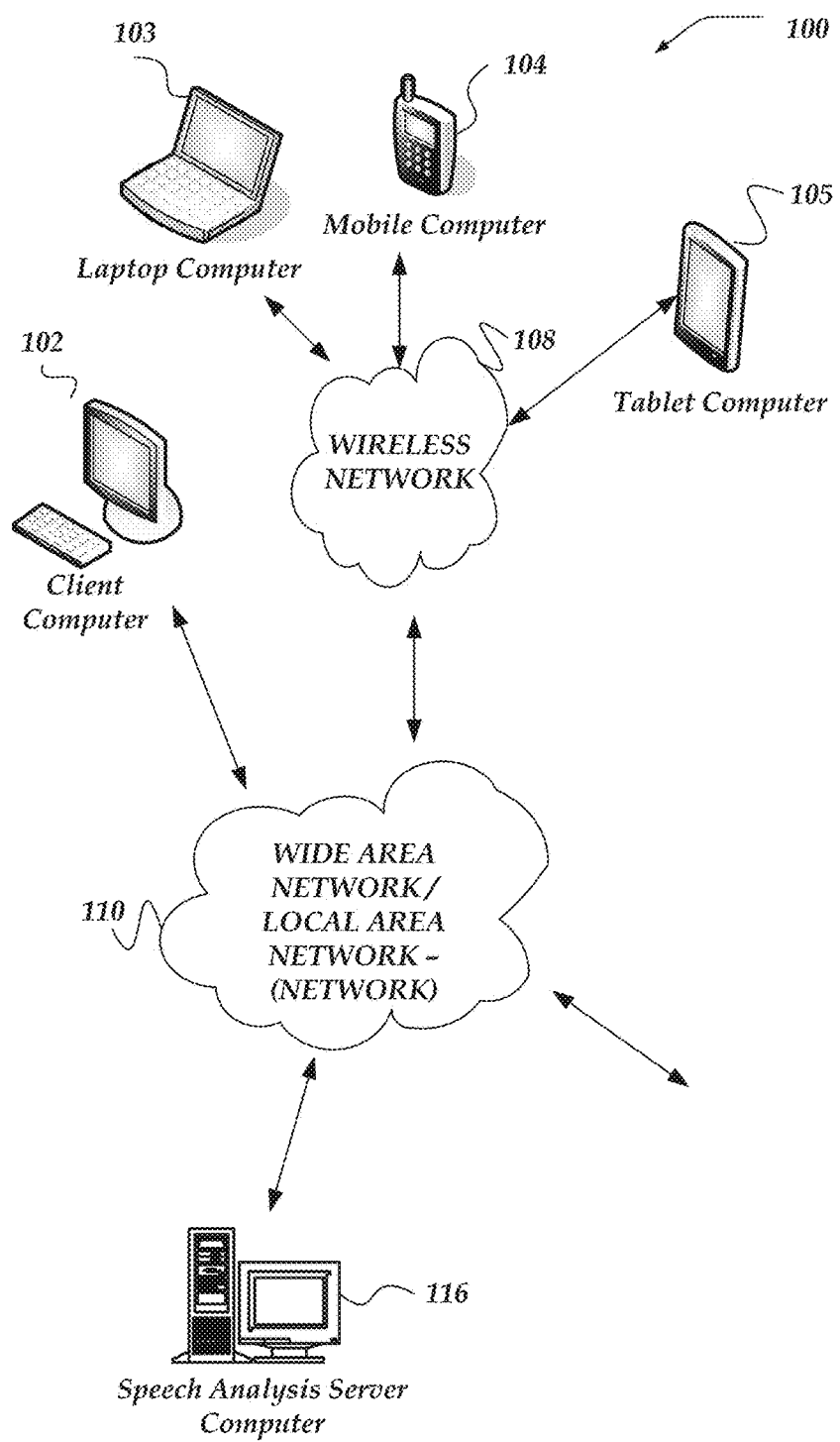
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, Rust, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "conversation" refers to a time-bound exchange of communicative speech between two or more persons. A conversation may be considered time-bound because they have a definite start time and end time. In some cases, a conversation may be a portion of larger conversation, but the conversation (the sub-conversation) may still have its own start time and end time. Also, conversations may be considered synchronous communication among or between two or more people. In some cases, a conversation may include only one speaker that is speaking to other persons (e.g., speeches, presentations, or the like). Conversations may occur in meetings, teleconferences, video conferences, presentations, speeches, or the like. In some cases, conversations may be recorded for playback later. Conversations may include multiple speakers, some who may be more important or more relevant than others. Typically, conversations may include one or more main subjects and one or more topics associated with the main subject. However, reflective of how person communicate, conversations may include portions that may be unrelated to a main subject of topic. For example, in some cases, conversations may include so-called small-talk, irrelevant cross-talk, side discussions, tangential discussions, or the like. Also, conversations, even though conversations may be comprised of synchronous communication exchanges, the subject or topic under consideration may jump around. Even speakers or presenters using well-defined outlines or agenda may jump back and forth within their outline/agenda.

As used herein the terms "conversation graph model" or "graph model" refer to a data structures that may be used to represent relationships between and among different words in a conversation. Graph models may be comprised of nodes and edges stored in the memory of a network computer. In some embodiments, the network computer may automatically update the configuration and composition of the graph model stored in the memory of the network computer to reflect the relationships between two or more words in a conversation. Nodes of the graph model may represent word in a conversation and the edges of the graph model may represent the relationships between the words in the conversation. Graph models may be illustrated herein using conventional node or edge representation, however, underlying data structures may represent graph models using arrays, tables, matrices, multi-dimensional arrays, lists, database tables, or the like.

As used herein the term "configuration information" refers to information that may include rule based policies, pattern matching, scripts (e.g., computer readable instructions), or the like, that may be provided from various sources, including, configuration files, databases, user input, plug-ins, extensions, loadable libraries, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to processing conversation speech in real-time or offline to determine the structure of the conversation, including key topics. In one or more of the various embodiments, the speech analysis platform may be arranged to generate graph models from the speech words in real-time absent a machine learning models that may require supervised training. In some embodiments, graph models may be generated as speech words are processed or provided.

In some embodiments, conversations may be converted to text (e.g. voice to text) before being provided to a modeling engine that may be arranged to generate conversation graph models. As words may be provided and processed, nodes representing one or more characteristics of the word may be generated and added to a graph model. Also, edges may be added to the graph model representing the strength of the relationships between the words (if any) in the conversation.

In some embodiments, the preliminary graph model may be partitioned into word groups based on the characteristics of the words represented by the model and the relationships.

Further, in some embodiments, separately (or concurrent) word sentences may be determined and processed to generate sentence models that may be used to identify key-phrases within each sentence (if any) based on various characteristics of the works within the sentence.

Further, the modeling engine may be arranged to generate a combined model based on merging the graph model and the sentence models. Accordingly, the combined model may be employed to determine topics and transition between topics. In some embodiments, speech keywords associated with the topics may be mapped to the conversation time-line to enable further analysis, include automatically generate conversation summaries, conversation indices, or the like.

Accordingly, the information included in the combined model may be employed to provide insights about the conversation based on the conversational structure from speech.

Moreover, one or more embodiments may be directed to modeling engines that may be arranged to provide a graph model for a conversation based on one or more words provided by a conversation stream such that each word may be associated with a node in the graph model and each edge in the graph model may corresponds to one or more relationships between each word.

In one or more of the various embodiments, modeling engines may be arranged to generate one or more sentence models based on the one or more words such that each sentence model corresponds to a sentence in the conversation and such that each sentence model provides one or more key phrases for each sentence.

In one or more of the various embodiments, modeling engines may be arranged to generate a combined model that associates one or more partitions of the graph model and the one or more key phrases with one or more portions of the conversation stream based on a correlation between the one or more key phrases and the one or more partitions of the graph model.

In one or more of the various embodiments, modeling engines may be arranged to employing the combined model to determine one or more dominance scores for the one or more portions of the conversation stream based on a strength of the correlation between the one or more key phrases and the one or more partitions of the graph model; and determining one or more context switches in the conversation based on the one or more dominance scores such that a transition from a portion of the conversation stream associated with a dominance score that exceeds a threshold value to another portion of the conversation stream associated with another dominance score that may be below another threshold values corresponds to each context switch and such that the one or more context switches are employed to identify one or more of topics or sub-topics in the conversation.

In one or more of the various embodiments, generating the graph model may include determining one or more characteristics of the one or more words such that the one or more characteristics include one or more natural language processing (NLP) features, including one or more of frequency of occurrence in the conversation, or time of occurrence in the conversation; determining the one or more relationships between the one or more words based on one or more of occurrence in a same sentence, a temporal distance in the conversation, or an occurrence in nearby sentences; associating the one or more words with one or more nodes in the graph model based on the one or more characteristics of the one or more words; and generating the one or more edges in the graph model based on the one or more relationships.

In one or more of the various embodiments, modeling engines may be arranged to determine one or more relationship scores for the one or more relationships between the one or more words in the graph model; associating each relationship score with an edge in the graph model that corresponds to the one or more relationships between each word; and partitioning the graph model based on one or more attributes of the nodes and one or more edges in the graph model such that nodes associated with the one or more relationship scores that exceed a threshold value are grouped into a same partition.

In one or more of the various embodiments, providing the one or more words may include providing the one or more words from one or more of a live conversation, a recorded conversation, a live video, a recorded video, a transcription of the conversation, or the like, such that speech in an audio portion of the live conversation, the recorded conversation, the live video, or the recorded video is converted into text.

In one or more of the various embodiments, generating the combined model may include generating an adjacency matrix that include one or more rows based on the graph model to represent the conversation such that the one or more rows of the adjacency matrix corresponds to the one or more portions of the conversation stream; modifying the adjacency matrix based on the sentence models to include one or more phrasal scores associated with the one or more key phrases in the conversation such that the one or more phrasal scores are included in the one or more rows that correspond to the one or more portions of the conversation stream at one or more positions in the conversation stream where the one or more key phrases occur in the conversation; determining one or more eigen values associated with the one or more portions of conversation stream based on the adjacency matrix; and employing the one or more eigen values to determine the one or more dominance scores associated with the one or more portions of the conversation stream.

In one or more of the various embodiments, generating the one or more sentence models may include providing one or more sentence words from the one or more words provided by the conversation stream based on natural language processing such that the one or more stop words may be excluded from the one or more sentence words; determining one or more phrase scores for the one or more sentence words based on a scoring model such that the scoring model determines the one or more phrase scores based on one or more of repetition of a di-gram in the sentence, a word-degree, a length of a phrase scaled the word-degree of the sentence, or the like; and determining the one or more key phrases in one or more sentence words based on the one or more phrase scores associated with the one or more key phrases exceeding a threshold value.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, speech analysis server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, speech analysis server computer 116, or other computers.

Client computers 102-105 may further be configured to include a client application that enables an end-user to log into an end-user account that may be managed by another computer, such as v speech analysis server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by speech analysis server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, speech analysis server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of speech analysis server computer 116 are described in more detail below in conjunction with FIG. 3. Although FIG. 1 illustrates speech analysis server computer 116, or the like, each as a single computer, the innovations or embodiments are not so limited. For example, one or more functions of speech analysis server computer 116, or the like, may be distributed across one or more distinct network computers. Moreover, in one or more embodiments, speech analysis server computer 116 may be implemented using a plurality of network computers. Further, in one or more of the various embodiments, speech analysis server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
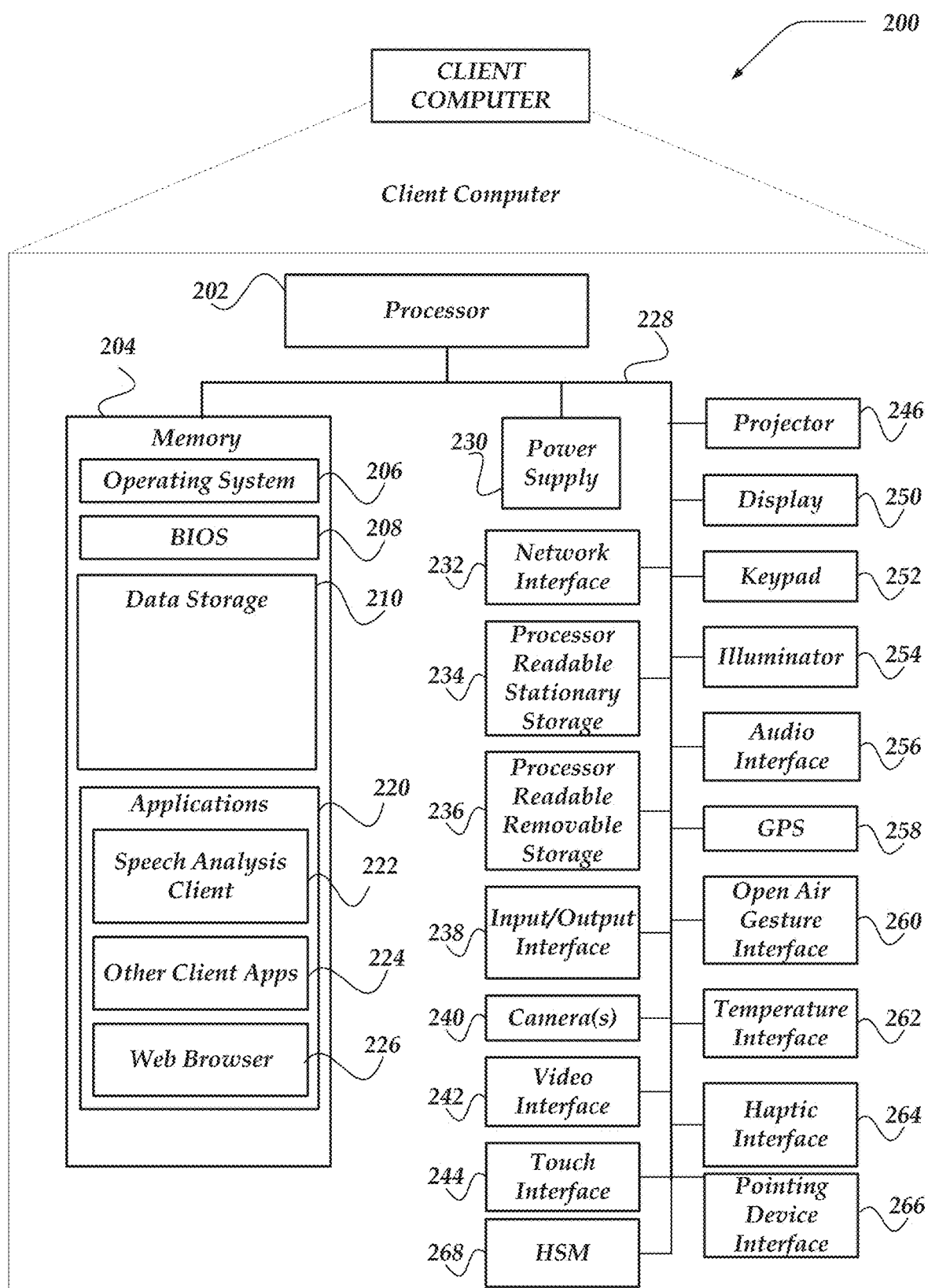
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, speech analysis client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, speech analysis client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
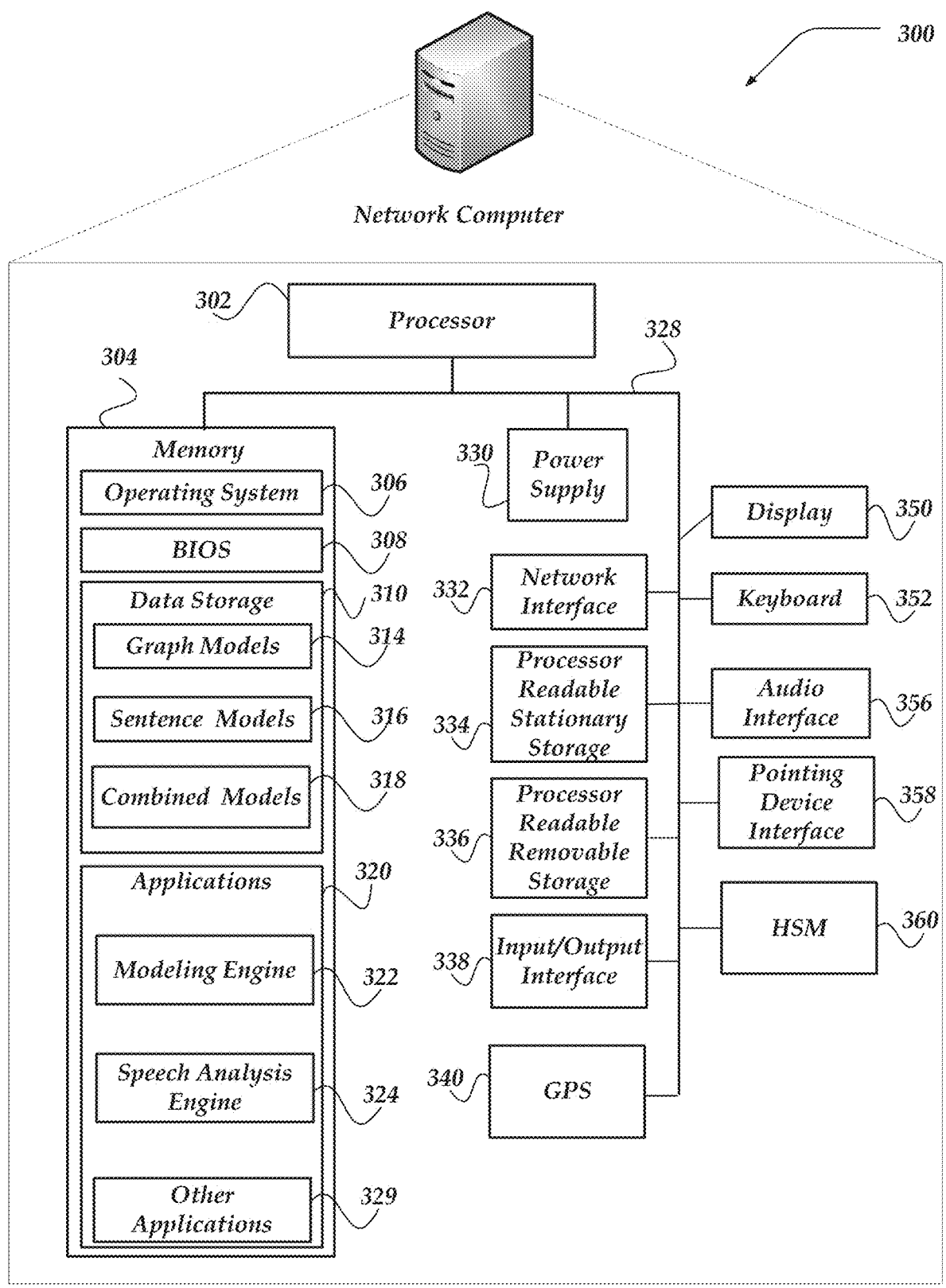
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of speech analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, speech analysis engine 324, other applications 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, graph models 314, sentence models 316, combined models 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, speech analysis engine 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, speech analysis engine 324, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, speech analysis engine 324, other applications 329, or the like, may be provisioned and de-commissioned automatically.

Also, in one or more of the various embodiments, modeling engine 322, speech analysis engine 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
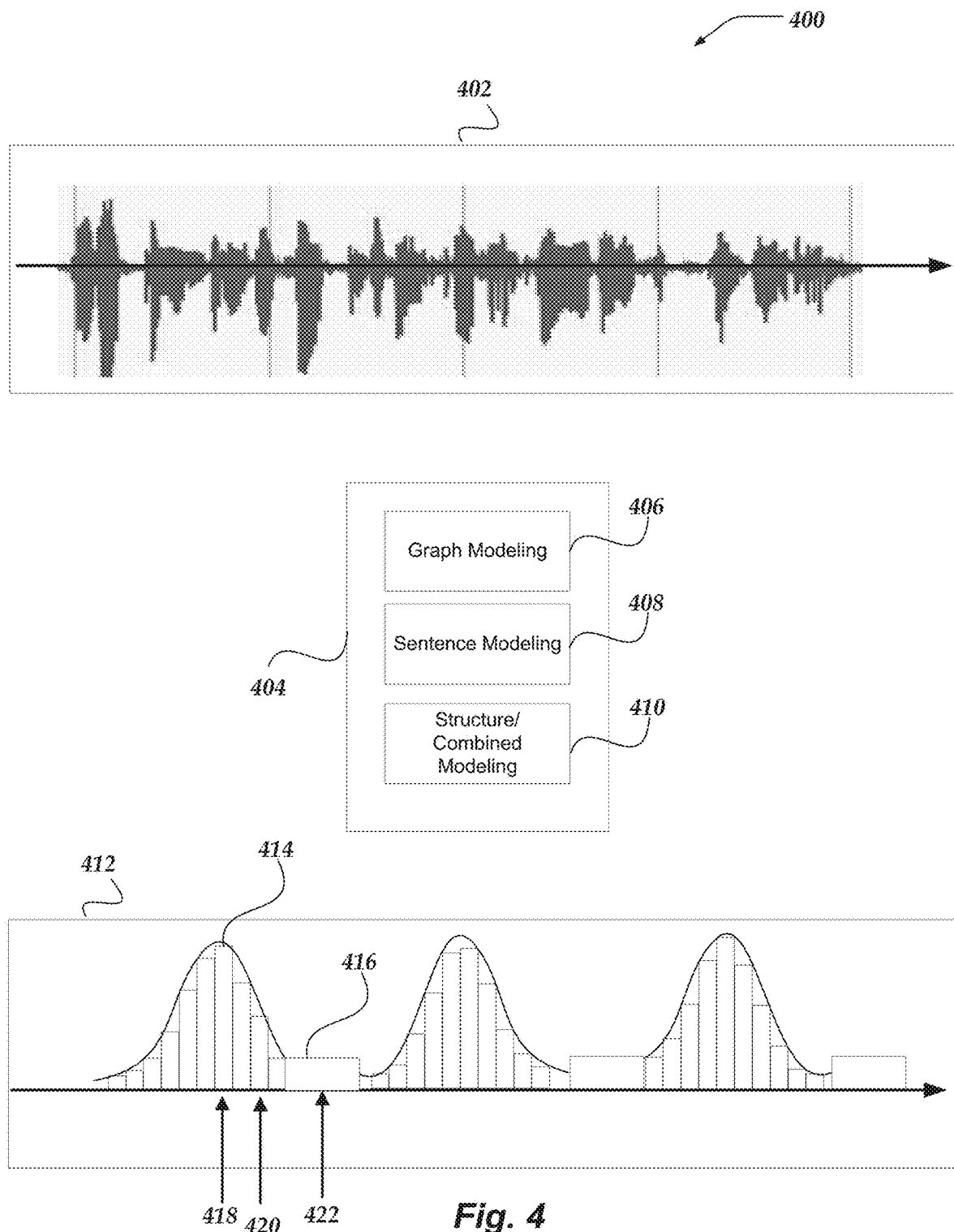
FIG. 4 illustrates a logical architecture of a system for determining conversational structure from speech in accordance with one or more of the various embodiments.

FIG. 4 represents a logical schematic of system 400 for determining conversational structure from speech in accord in accord with one or more of the various embodiments. In one or more of the various embodiments, speech analysis platforms may be arranged to accept audio streams of conversations, such as, audio stream 402. In some embodiments, audio stream 402 may be a recorded audio file that may be processed after the conversation has concluded. In some embodiments, audio streams, such as, audio stream 402 may be real-time streams of audio provided as a conversation is happening.

In one or more of the various embodiments, audio stream 402 may be provided to a speech analysis platform, that includes a modeling engine, such as, modeling engine 404. In some embodiments, modeling engines may be arranged to include various components or sub-engines, such as, graph modeling engine 406, sentence modeling engine 408, combined modeling engine 410, or the like. In some embodiments, graph modeling engine 406, sentence modeling engine 408, combined modeling engine 410 may be arranged to perform one or more actions for determining conversational structure from speech.

In one or more of the various embodiments, modeling engines may be arranged to generate conversation digests, such as, conversation digest 412 based on audio streams, such as, audio stream 402. In one or more of the various embodiments, conversation digests may be data structures that represent conversation audio streams (speech). In some embodiments, conversation digests may be arranged to enable speech analysis engines (not shown) to reliably interpret one or more characteristics of conversations. In some embodiments, conversation digests may be arranged to represent the contextual structure of a conversation.

In one or more of the various embodiments, conversation digests may be arranged to represent a conversation as a sequence of topic portions and connection portions. In some embodiments, topic portions may be portion of a conversation that include material topic information. In contrast, in some embodiments, connection portions of a conversation represent the transition from one topic portion to another. In some embodiments, topic portions may be referred to as blocks and connection portions may be referred to as hinges. Herein, the terms topic portions and connection portions may be considered to mean the same thing as block and hinges. For brevity and clarity, the term blocks will used to represent the topic portions of conversation digests and the term hinges will be used to represent the connection portion of conversation digests.

In this example, for some embodiments, conversation digest 412 includes one or more blocks, such as, block 414 and one or more hinges, such as, hinge 416. Further, in some embodiments, blocks may be associated with one or more topics or sub-topics of a conversation. In this example, block 414 includes topic 418 and sub-topic 420.

In one or more of the various embodiments, topics may correspond to key words in the conversation. In some blocks, there may be one word that may be determined to the key topic while some other words may be sub-topics that are related to the key topic. Also, in some embodiments, some words that occur in the part of conversation corresponding to a block may be not be topics. In this example, topic 418 may be considered a key topic while topic 420 may be sub-topic related to topic 418.

Further, conversations or portions of conversations occur over a period of time from start to finish. Accordingly, in some embodiments, the time sequence or timeline of the actual conversation may be maintained in the correspond conversation digest. In this example, timeline 422 represents the time sequence of audio stream 402 and conversation digest 412. Thus, in some embodiments, the first block (e.g., block 414) of a conversation digest may correspond to the beginning of its source audio stream.

In one or more of the various embodiments, audio streams, such as, audio stream 402 may be converted into text. In some embodiments, a speech analysis platform may be arranged to employ conventional or customized speech-to-text facilities to convert audio streams of conversations into text suitable for additional processing. In some embodiments, the text version of the conversation may be associated with index or counter values that may correspond to the timeline of the conversation. Thus, in some embodiments, speech analysis platforms may be enabled to associate various words to when they appeared in the audio stream or the conversation timeline.

In one or more of the various embodiments, modeling engines, such as, modeling engine 404 may be arranged to generate a conversation graph model that represents the conversation. In some embodiments, conversation graph models (not shown) may be comprised of nodes that represent words of the conversation and edges that represent relationships between the words in the conversation.

Also, in one or more of the various embodiments, modeling engines may be arranged to generate sentence models for the sentences comprising a conversation.

Further, in one or more of the various embodiments, modeling engines may be arranged to generate one or more combined models based on information derived from conversation graph models and sentence models. Accordingly, in some embodiments, modeling engines may be arranged to generate conversation digests from combined models.

In one or more of the various embodiments, speech analysis engines, such as, speech analysis engine 324, or the like, may be arranged employ conversation digests to generate reports, responses, or the like, in response to on one or more queries.

Figure 5:
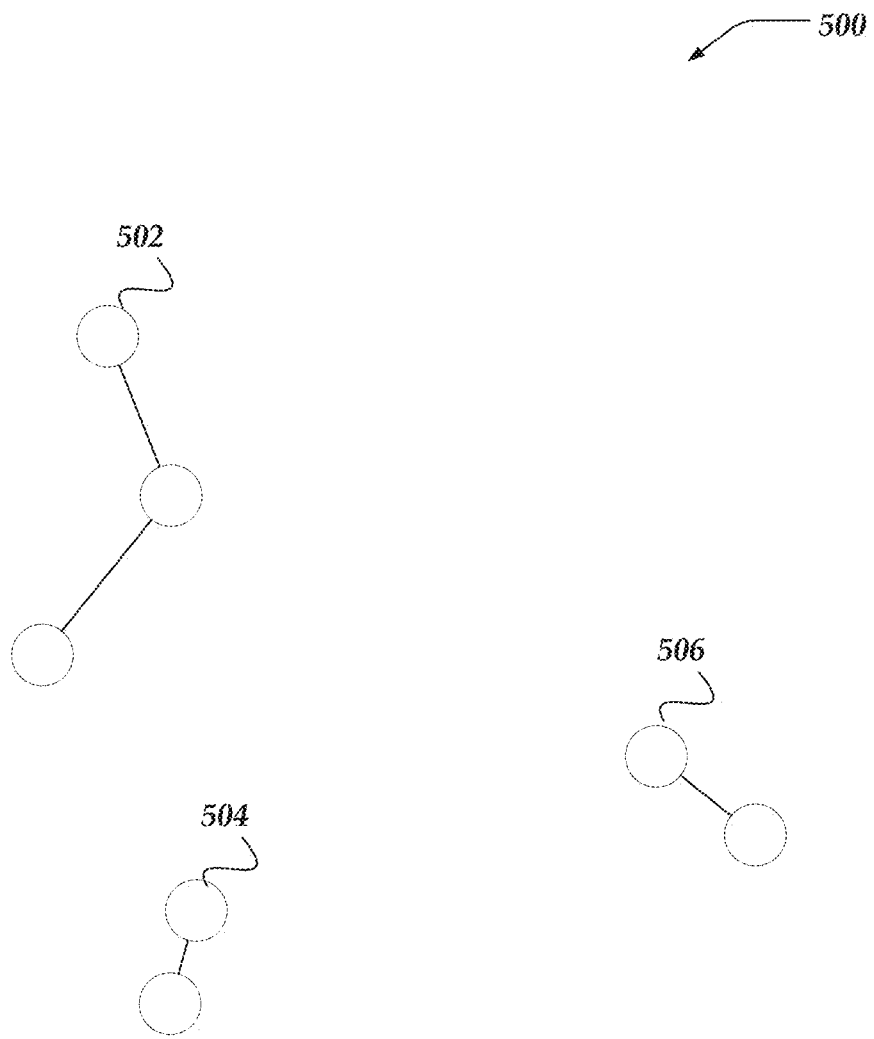
FIG. 5 illustrates a logical schematics of a graph model for determining conversational structure from speech in accordance with one or more of the various embodiments.

FIG. 5 illustrates a logical schematic of graph model 500 for determining conversational structure from speech in accord with one or more of the various embodiments. In some embodiments, graph models may be comprised on one or more nodes connected by one or more edges. In some embodiments, nodes in a graph model may represent individual words in a conversation. Similarly, in some embodiments, edges in the graph model may represent relationships between the words in the conversation.

In one or more of the various embodiments, modeling engines may be arranged to progressively generate graph models as words of a conversation may be provided. In this example, for some embodiments, node 502 may represent a word from a conversation. Likewise, in some embodiments, node 504 and node 506 may represent other words in the conversation that have a relationship with the word represented by node 502. Similarly, node 508, node 510, and node 512 may represent other words. In this example, node 508 and node 510 are related, as indicated by the edge connecting them. In contrast, in some embodiments, node 512 may be unconnected to other nodes because the modeling engine has not discovered words related to the word represented by node 512. Further, in this example, the sub-graph that is rooted by node 502 may be considered to unrelated to the sub-graph rooted by node 508 except that both are in the same conversation.

In one or more of the various embodiments, as additional words of the conversation are provided to the modeling engine, additional nodes or edges may be added to graph model 500 depending on the words and their associated characteristics.

In one or more of the various embodiments, one or more characteristics of a word may be associated with its corresponding node. In some embodiments, nodes in graph models may be arranged to include one or more attributes that represent one or more characteristics of a word. For example, the one or more attributes may represent information, such as, time mark of the word, word counts, one or more references into the full conversation, one or more references to the source audio stream, or the like.

Also, in one or more of the various embodiments, the edges of a graph model may be arranged to be associated with one or more attributes that represent one or more characteristics of the relationship between the connected word nodes.

In one or more of the various embodiments, modeling engines may be arranged to associate or infer a strength of the relationship between words based on various characteristics of the conversation, the individual word, or nearby words.

In one or more of the various embodiments, modeling engines may be arranged to exclude or filter one or more words from being included in graph models. In some cases, modeling engines may be arranged to refer to a list or stop words, or the like, that may be excluded from graph models. In some embodiments, modeling engines may be arranged to employ standard, conventional, or customized lists of words to exclude from the graph model. In some embodiments, modeling engines may be arranged to enable users or organizations to modify lists of excluded words. Accordingly, in some embodiments, modeling engines may be arranged to employ configuration information to determine the specific words to exclude.

Figure 6:
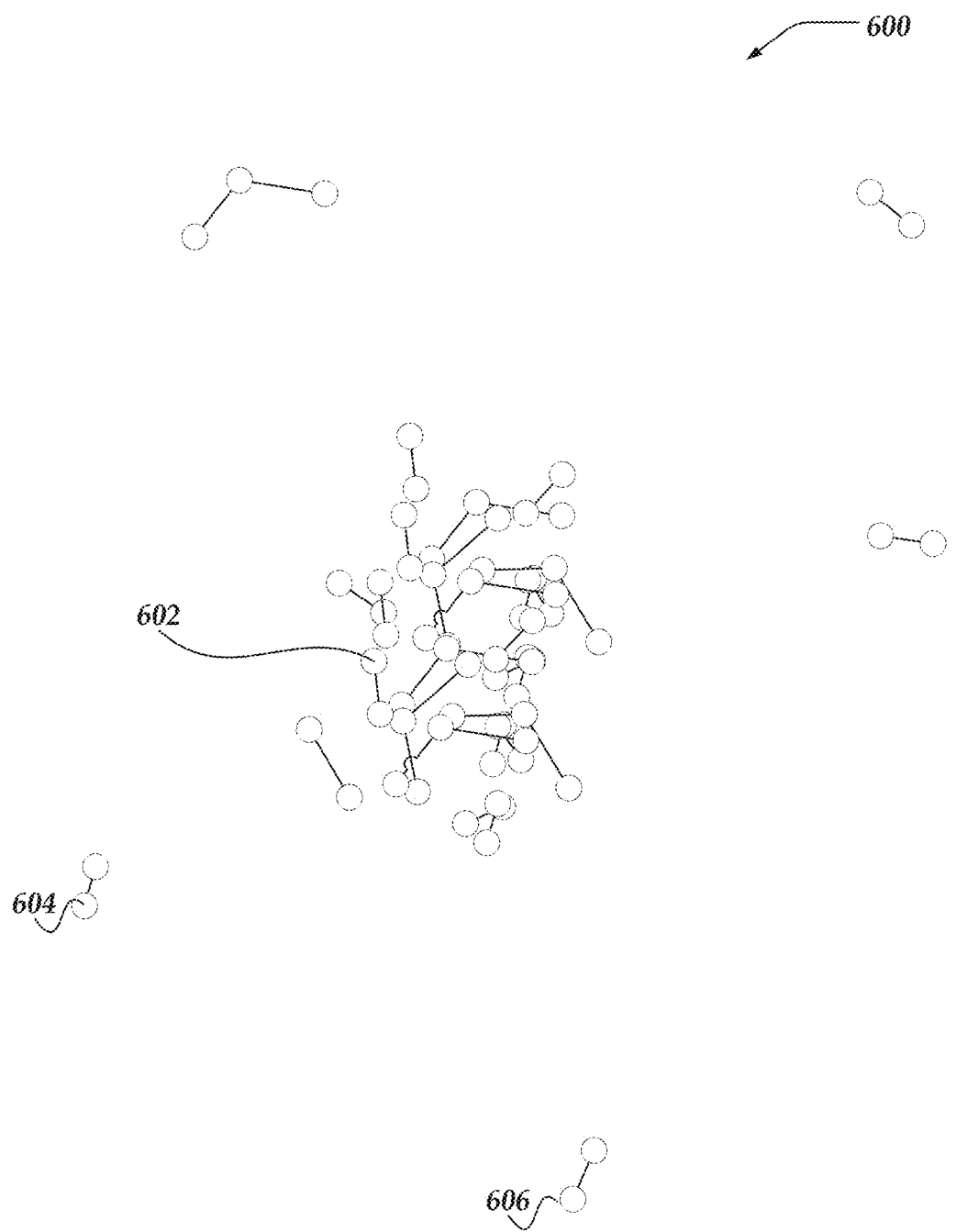
FIG. 6 illustrates a logical schematic of a graph model that represents a conversation model that may be employed to determine conversational structure from speech in accordance with one or more of the various embodiments.

FIG. 6 illustrates a logical schematic of graph model 600 that represents a conversation graph model that may be employed to determine conversational structure from speech in accordance with one or more of the various embodiments. In this example, graph model 600 may be considered similar to graph model 500 except it represents many more words that are shown for graph model 500.

In one or more of the various embodiments, as words may be provided to modeling engines, the modeling engines may be arranged to generate graph models, such as, graph model 600. In some embodiments, if the conversation has a overall topic or theme (as most conversations between people do), words related to the overall topic or theme of the conversation may cluster together in the graph model, as shown here where node 602 and its neighbors may be considered to represent words clustered together. Likewise, in some embodiments, words that may be less related to the core topics or themes of a conversation may be logically isolated as represented by node 604 and node 606.

Figure 7:
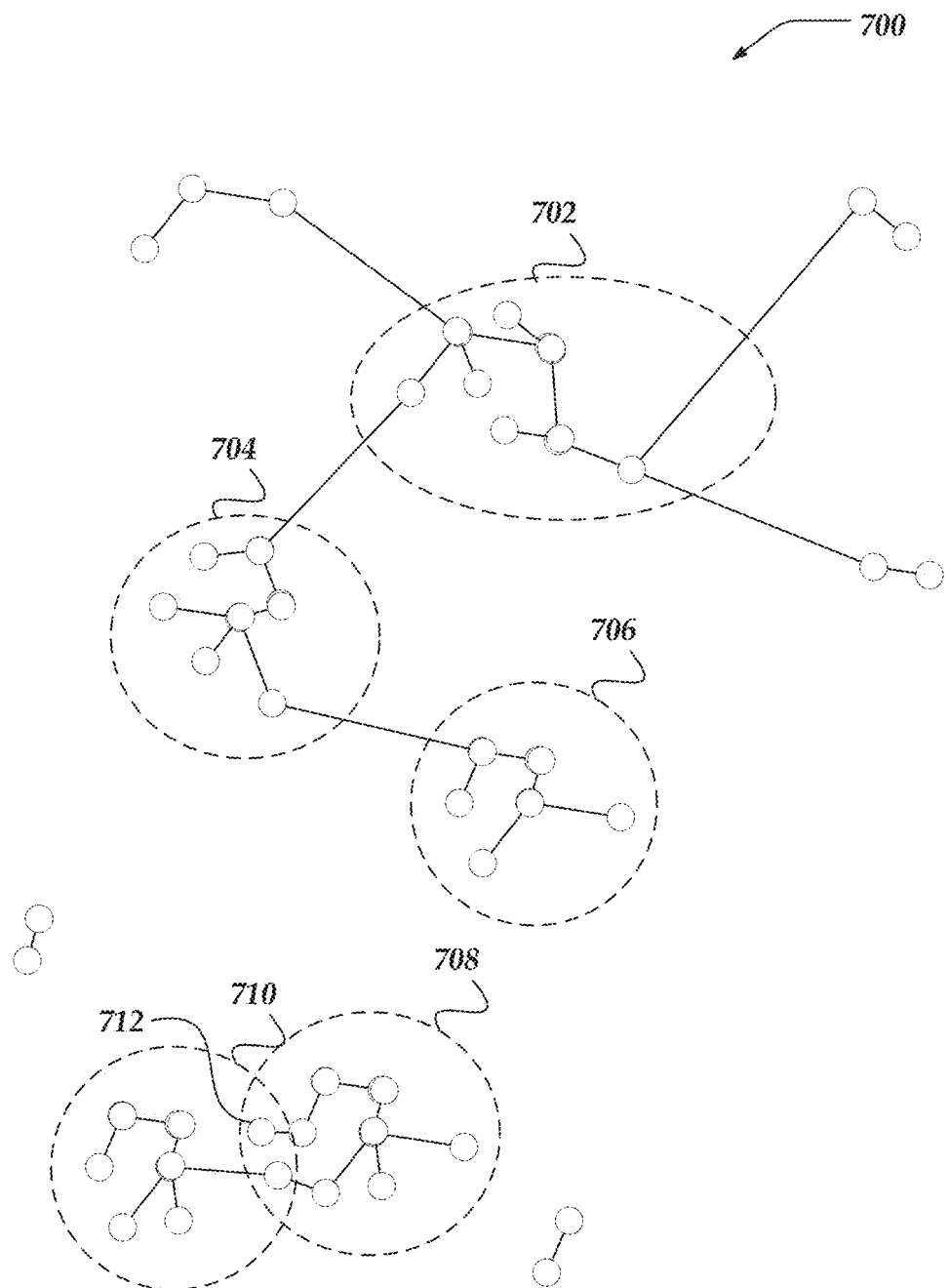
FIG. 7 illustrates a logical schematic of partitioned a graph model that represents a conversation model partitioned to determine related word groups in a conversation to determine conversational structure from speech in accordance with one or more of the various embodiments.

FIG. 7 illustrates a logical schematic of partitioned graph model 700 representing a conversation model partitioned to determine related word groups in a conversation to determine conversational structure from speech in accordance with one or more of the various embodiments. In this example, graph model 700 may be considered similar to graph model 600 or graph model 500 except with more nodes and the partitions.

In one or more of the various embodiments, modeling engines may be arranged to automatically partition graph models into various clusters of word nodes. In this example, partition 702, partition 704, or partition 706 may represent clusters of words that the modeling engine has determined to be sufficiently related to each other such that may be grouped together.

In one or more of the various embodiments, modeling engines may be arranged to execute one or more clustering/partition algorithms to partition graph models. In some embodiments, partitioning may be a continuous process that may process graph models as new nodes or edges may be added. In some embodiments, one or more partitions may overlap. Accordingly, in some embodiments, modeling engines may be arranged to perform additional processing to separate overlapped partitions. In some embodiments, modeling engines may be arranged to determine one or more nodes, such as, node 712 that may be claimed by two or more partitions. In some embodiments, modeling engines may be arranged to assign word nodes claimed by two or more partition nodes to one of the partition nodes and then evaluate the stability of partitions after the assignment.

In one or more of the various embodiments, modeling engines may be arranged to iteratively evaluate the strength of relationships between words in graph models to partition the words of the conversation. As more words are collected from a conversation, the graph models and the partitions may begin to stabilize or otherwise reach equilibrium.

Generalized Operations for Determining Conversational Structure

FIGS. 8-14 represent generalized operations for determining conversational structure from speech in accordance with one or more of the various embodiments. In one or more of the various embodiments, processes 800, 900, 1000, 1100, 1200, 1300, and 1400 described in conjunction with FIGS. 8-14 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-14 may be used for determining conversational structure from speech in accordance with at least one of the various embodiments or architectures such as those described in conjunction with FIGS. 4-7. Further, in one or more of the various embodiments, some or all of the actions performed by processes 800, 900, 1000, 1100, 1200, 1300, and 1400 may be executed in part by modeling engine 322, speech analysis engine 324, or the like, by one or more processors of one or more network computers.

Figure 8:
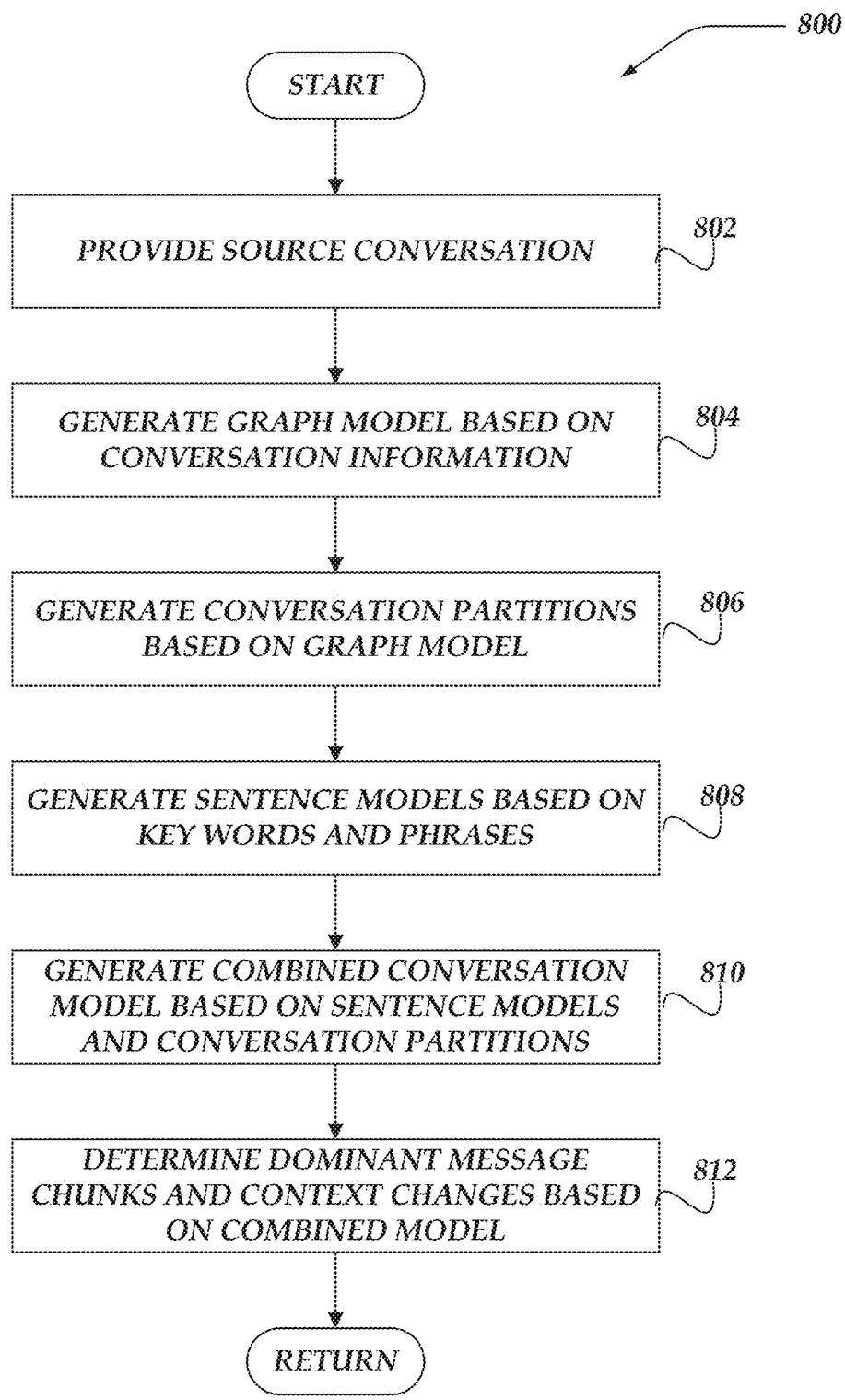
FIG. 8 illustrates an overview flowchart for a process for determining conversational structure from speech in accordance with one or more of the various embodiments.

FIG. 8 illustrates an overview flowchart for process 800 for determining conversational structure from speech in accordance with one or more of the various embodiments. After a start block, at block 802, in one or more of the various embodiments, a source conversation may be provided to a modeling engine. In one or more of the various embodiments, a source conversation may be provided from a real-time audio stream of an ongoing conversation, meeting or presentation. In some cases, source conversations may include two or more persons. In other cases, source conversations may be one or more persons presenting or otherwise speaking to an audience. Also, in some embodiments, the source conversation may be provided via a recording of the conversation.

In one or more of the various embodiments, source conversations may be processed in real-time or in-advance to generate text from audio streams. In some embodiments, the speech-to-text processing may be performed by a third-party/external service. Also, in some embodiments, modeling engines may be arranged to execute one or more conventional or non-conventional speech-to-text processing techniques to convert audio streams of conversations into text.

In one or more of the various embodiments, modeling engines may be arranged to process conversations word-by-word, sentence-by-sentence, paragraph-by-paragraph (snippets), or the like. In some embodiments, conversations may be provided with additional meta-data, including, time-stamp/time-line markers, channel markers, references or identifiers to portions/locations in the source audio stream, or the like. Also, in some embodiments, conversation words may be provided as a stream of text words. In some embodiments, conversation meta-data may include tags or markers that indicate conversational whitespace, such as, quiet periods, stops, starts, dead-air, or the like.

Note, herein unless the context or usage is clearly to the contrary, conversations, words, sentences, or the like, may be considered to be text that has been generated from a text-to-speech process, service, or the like. Also, in some embodiments, conversations may be provided from text sources, such as, text chats, online forum posts/comments, other native text documents, or the like.

At block 804, in one or more of the various embodiments, the modeling engine may be arranged to generate a graph model based on conversation information derived from the source conversation. In one or more of the various embodiments, modeling engines may be arranged to add individual words to a graph model. In some embodiments, each word may be included as a node in the graph model. In some embodiments, one or more relationships between each word and other words may be represented by edges in the graph model that connect to other nodes.

In one or more of the various embodiments, modeling engines may be arranged to generate one or more metrics based on one or more characteristics of the word or conversation to determine the presence of relationships as well as the strength of the relationships. Accordingly, in some embodiments, edges in the graph model may be associated with at least one attribute that represents the strength of the relationship.

In one or more of the various embodiments, conversation graphs include or capture information associated with the occurrence of words and one or more natural language processing (NLP) metrics. In one or more of the various embodiments, nodes in a conversation graph may represent the words that occurred in the conversation and the edges represent relationships between words. In one or more of the various embodiments, an edge connection two or more word nodes may be considered to represent a bundle of relationships represented by different NLP metrics, such as, number of time words occur in the same sentence, words in nearby sentences, or the like, as discussed in more detail below.

In one or more of the various embodiments, one or more NLP metrics associated with nodes or edges in conversation graphs may aggregate as the same words occur in other parts of the same conversation. Accordingly, in some embodiments, the strength of relationships between words may change as a conversation is processed. Thus, in some embodiments, while conversation graphs may capture important metrics about words in the conversations they may lose time information associated the context of when the words occurred in the conversation.

At block 806, in one or more of the various embodiments, the modeling engine may be arranged to generate one or more conversation partitions based on the graph model. In one or more of the various embodiments, modeling engines may be arranged to perform one or more actions to partition the graph model into clusters of nodes based on the strength of the relationships between words in the graph model.

In one or more of the various embodiments, modeling engines may be arranged to associate each partition with a partition identifier. In some embodiments, modeling engines may be arranged to determine one or more relationships between each partition based on one or more relationships between the words included in the partitions. For example, in some embodiments, partitions that share one or more of the same words may be considered related based on the shared words. However, in some cases, one or more partitions may be considered unrelated in the sense that they do not have overlapping words or other relationships with words in other partitions.

At block 808, in one or more of the various embodiments, the modeling engine may be arranged to generate one or more sentence models based on key words or phrases included in sentences provided in the source conversation. In addition to generating a graph model representing the conversation, modeling engines may be arranged to generate sentence models based on sequences of words determined be in the same sentence.

In one or more of the various embodiments, sentence models may be arranged to include or identify key phrases or key words in each sentence. Also, in some embodiments, sentence models may be associated with a location value in the conversation that corresponds to when the sentence occurred in the conversation.

At block 810, in one or more of the various embodiments, the modeling engine may be arranged to generate a combined conversation model based the one or more sentence models and the partitioned graph model.

In one or more of the various embodiments, modeling engines may be arranged to provide a combined model based on the conversation graph and sentence models of a conversation. In some embodiments, combined models may correlate node words or partitions from conversation graphs with sentences based on phrases or keywords determined from a given sentence model. In some embodiments, the strength of the correlation between the words in a sentence and nodes in a conversation graph may be determined based on one or more NLP metrics including a weight score of the keywords sentence models.

In one or more of the various embodiments, by correlating sentences with nodes, modeling engines may tie information from the conversation graph locations in the conversation based on where/when a correlated sentence occurred in a conversation.

For example, in some embodiments, a node representing a word in a conversation graph may have been mentioned multiple times in a conversation. Accordingly, in one or more of the various embodiments, during the construction of the conversation graph, NLP metrics including strength of relationships to other nodes may be aggregated. Also, in some embodiments, relationships between two or more nodes may be impacted by different parts or portions of a conversation. Thus, in some embodiments, correlating conversation graph nodes or partitions with sentence models enables dominant words identified by the conversation graph to be linked with specific portions of the conversations.

At block 812, in one or more of the various embodiments, the modeling engine may be arranged to determine one or more dominant conversation portions and one or more context changes based the combined conversation model. In one or more of the various embodiments, dominant portions of the conversation are portions of the conversation that may be associated with key words or key phrases (conversation topics). In some embodiments, context changes may be considered portions of the conversation that connect the dominant portions.

In one or more of the various embodiments, modeling engines may be arranged to analyze combined models to generate conversation digests that enable dominant subjects or topics to be associated with the portion of the conversation where they occur.

Next, in one or more of the various embodiments, control may be returned to a calling process.

Figure 9:
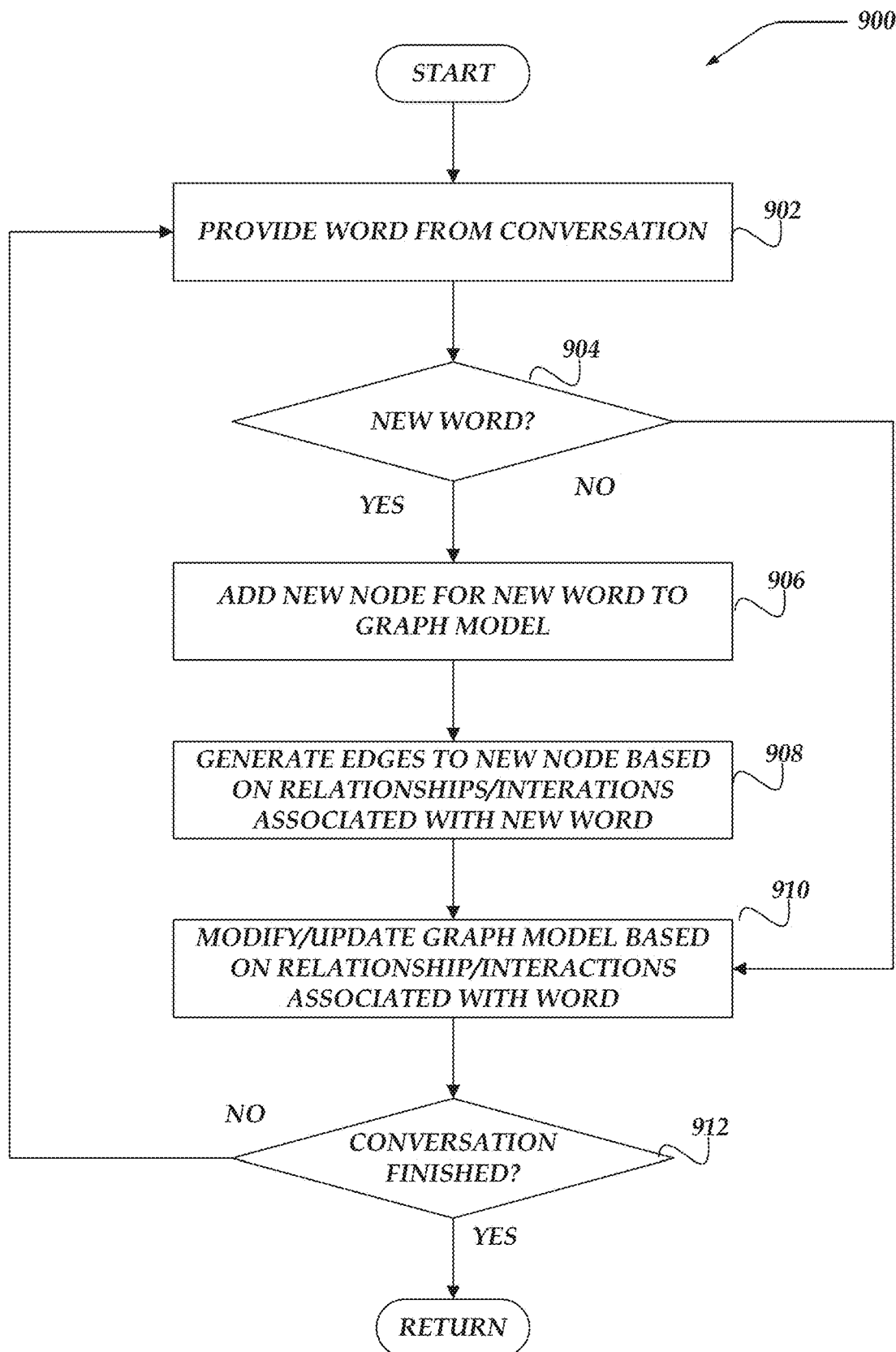
FIG. 9 illustrates a flowchart for a process for generating graph models from conversation words for determining conversational structure from speech in accordance with one or more of the various embodiments.

FIG. 9 illustrates a flowchart for process 900 for generating graph models from conversation words for determining conversational structure from speech in accordance with one or more of the various embodiments. After a start block, at block 902, in one or more of the various embodiments, a word from a conversation may be provided to a modeling engine.

At decision block 904, in one or more of the various embodiments, if word is new, control may flow to block 906; otherwise, control may flow to block 910. In one or more of the various embodiments, modeling engines may be arranged to process conversational speech. In some embodiments, conversational speech may be provided from a variety of sources. In some embodiments, speech may be provided in real-time from ongoing conversations. Also, in some embodiments, speech may be provided from recorded conversations, or the like.

At block 906, in one or more of the various embodiments, the modeling engine may be arranged to add a new node for the new word to the graph model. In some embodiments, modeling engines may be arranged to exclude words deemed unimportant from the graph model. In some embodiments, such words may be words that are known to carry little information. In some cases, such words may be referred to as stop words. Accordingly, in some embodiments, modeling engines may be arranged to compare incoming words against a dictionary, catalog, or list that includes the words that should be discarded or otherwise ignored. In some embodiments, some or all of the words may be provided from conventional lists of stop words. Also, in some embodiments, modeling engines may be arranged to enable users or organizations to customize the discard list by adding or removing words. Accordingly, in some embodiments, modeling engines may be arranged to determine one or more of the words to discard based on configuration information to account for local requirements or local circumstances.

At block 908, in one or more of the various embodiments, the modeling engine may be arranged to generate one or more edges for the new node based on one or more relationships or one or more interactions associated with the new word.

In one or more of the various embodiments, each edge may represent one or more relationships between words in a conversation. In some embodiments, edges may be associated with one or more NLP features or other attributes that may represent different aspects or dimensions of the relationships words may have with each other.

In some embodiments, modeling engines may be arranged to associate relationship scores that may represent the strength of the different relationships represented by each edge. In some embodiments, modeling engines may be arranged to generate a composite relationship score between two nodes based on the strength of two or more relationships between the same node. Also, in some embodiments, a composite score may be based on the number of times a same relationship may be observed in the same conversation. In some embodiments, modeling engines may be arranged to weight different types of relationships differently if generating composite scores. In some embodiments, different types of conversations may have different subject matter, different number of participants, different levels of participation by persons in the conversation may benefit from different weighting of relationships. For example, in some embodiments, a four person meeting of peers may benefit from different score weighting than a presentation given by one person. Likewise, in some embodiments, an organization may determine that one or more particular types of relationships or certain words should be weighted in a particular way. For example, words representing important customers, products, persons, events, or the like, may be designated as being associated with different weighting depending on the needs of the organization. Accordingly, in some embodiments, modeling engines may be arranged to employ configuration information to determine specific strength of relationship weighting.

Likewise, in some embodiments, different types of conversations, participants, subjects, or the like, may benefit from different NLP metrics that may be employed to determine relationships between word nodes. For example, an organization may be enabled to configure modeling engines to use particular metrics for certain words, such as, key products, key competitors, or the like. Thus, in some embodiments, modeling engines may be arranged to employ configuration information to determine one or more NLP metrics that may be employed to account for local requirements or local circumstances.

At block 910, in one or more of the various embodiments, the modeling engine may be arranged to modify/update the graph model based on the one or more relationships or the one or more interactions determined to be associated with the new word. As a conversation continues, modeling engines may be provide additional words that may be added to the conversation graph. Likewise, in some embodiments, the NLP metrics (or relationships) associated with previously seen words may be updated based on their re-occurrence in the same conversation.

At decision block 912, in one or more of the various embodiments, if the all the words in the conversation have been processed, control may be returned to a calling process; otherwise, control may loop back to block 902 to process the next remaining words.

Next, in one or more of the various embodiments, control may be returned to a calling process.

Figure 10:
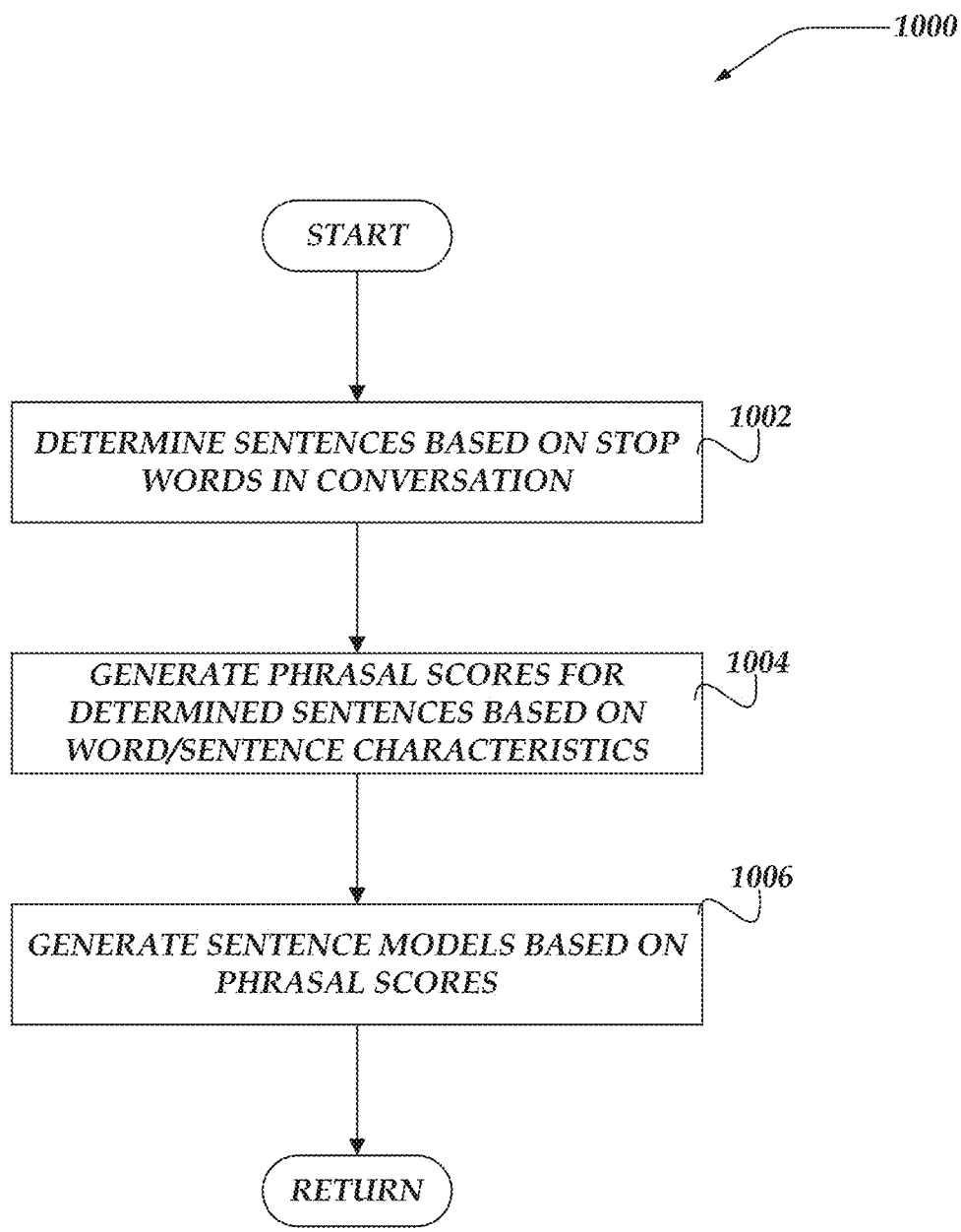
FIG. 10 illustrates a flowchart for a process for generating sentence models from conversation words for determining conversational structure from speech in accordance with one or more of the various embodiments.

FIG. 10 illustrates a flowchart for process 1000 for generating sentence models from conversation words for determining conversational structure from speech in accordance with one or more of the various embodiments. After a start block, at block 1002, in one or more of the various embodiments, a modeling engine may be arranged to determine one or more sentences based on one or more stop words or other signals included in the source conversation.

Also, in one or more of the various embodiments, modeling engines may be arranged to exclude one or more sentences from modeling. Accordingly, in some cases, one or more sentences may be excluded from this process based on filters or other rules. In some embodiments, the excluded sentences may be sentences that may be recognized or processed using specialized pattern matching, classifiers, or the like. For example, sentences that include acknowledgment phrases, no phrases (e.g., single words), location addresses, phone numbers, or the like, may be automatically excluded from modeling.

In some embodiments, if a sentence may be determined to include an address or telephone number, a specialized pattern matcher, or the like, may be employed to extract the relevant information. In some embodiments, while excluded sentences may include important information (e.g., addresses, telephone numbers, or the like) they may not be considered important determining the conversational structure of the conversation. Thus, in some embodiments, they may be excluded from further consideration by a modeling engine.

At block 1004, in one or more of the various embodiments, the modeling engine may be arranged to generate phrasal scores for the sentences based on one or more characteristics of the of the words or phrases included in the sentence. In one or more of the various embodiments, modeling engines may be arranged to determine key phrases in sentences to enable the key phrases to be matched with key words of partitions from the graph model.

In one or more of the various embodiments, modeling engines may be arranged to perform one or more actions to determine and score phrases in sentences to determine the key phrases. In some embodiments, modeling engines may be arranged to employ various strategies for scoring phrases. In some embodiments, different languages may require different scoring strategies that may account for grammatical or linguistic differences. Accordingly, in some embodiments, modeling engines may be arranged to enable organizations or users to modify how phrases may be scored based on local requirements or local circumstances. Thus, in some embodiments, modeling engines may be arranged to employ rules, instructions, parameter values, or the like, provided via configuration information to account for local circumstances or local requirements.

In one or more of the various embodiments, modeling engines may be arranged to assume that conversations may be driven by the key phrases. Accordingly, in some embodiments, if the key phrases may be determined, the modeling engine may associate the key phrases (and their corresponding sentences) with the partitions of the conversation graph that include key words that comprise the key phrases.

Accordingly, in some embodiments, modeling engines may be arranged to determine phrasal scores by generating a sub-graph of the sentences. In some embodiments, modeling engines may be arranged to separate the words in sentences based on one or more stop words. In some embodiments, stop words may be provided from a standard or conventional list of stop words for a given language. In some embodiments, modeling engines may be arranged to enable users or organizations to customize the stop word lists to account for local requirements. For example, in some embodiments, one or more conventional stop words may have different meanings or importance in some subject matter domains, language dialects, or languages, or the like. Accordingly, in some embodiments, modeling engines may be arranged to determine the actual stop words based on configuration information.

In some embodiments, modeling engines may be arranged to determine one or more phrases by determining one or more contiguous blocks or sets of words in the sentence that were separated by stop words. For example, if a sentence includes "A fine brown cow is ready to make a cheese pizza", modeling engines may determine the following phrases: "fine brown cow", "ready", "make", "cheese pizza".

At block 1006, in one or more of the various embodiments, the modeling engine may be arranged to generate one or more sentence models based on the phrasal scores.

In one or more of the various embodiments, sentence models may rank the phrases in the sentences based on phrasal scoring. In one or more of the various embodiments, the phrases with the highest scores may be considered the key phrase in a sentence.

In one or more of the various embodiments, modeling engines may be arranged to rank phrases in the sentence based on at least the number of times a phrase is repeated in a sentence, word-degree of words in the phrases, length of a phrase scaled with respect to the word-degree of the sentence.

In one or more of the various embodiments, modeling engines may be arranged to compute word degree scores for phrases by determining a degree score for each word included in sentence phrases and adding them together. For example, a sentence that includes "A scoop of ice cream" may be broken into the following phrases: "scoop", "ice cream" after stop words are removed.

In this example, the modeling engines may be arranged to determine a degree score for each word based on how often a word occurs with other words in phrases of the sentence. In this example, the word "scoop" occurs once with no other words, so it has a degree score of 1. In contrasts, the word "ice" occurs with the word "cream" so it has a degree score of 2. Also, in this example, the word "cream" occurs with the word "ice" so it also has a degree score of 2.

Determining the repetition score for each phrase in this example, results in a repetition scores of 1 for "scoop" and 1 for "ice cream". Accordingly, in this example, modeling engines may be arranged to generate phrase scores by dividing the degree scores of a phrase by its frequency score. In this example, the degree score for "scoop" is 1 and its frequency score is 1, thus its phrase score is 1. Also, in this example, the degree score for "ice cream" is 4 and its frequency score is 1, so its phrase score is 4. Thus, in this example, "ice cream" may be the phrase in the sentence "A scoop of ice cream" with the highest phrase score. Note, in practice, more than one phrase in a sentence may have the same phrase score.

In one or more of the various embodiments, modeling engines may be arranged to evaluate the grammar (parts of speech) associated with words in a sentence. In some embodiments, modeling engines may be arranged to identify subjects, objects, noun words, pronoun words, verb words, adjective words, or the like. In some embodiments, modeling engines may be arranged to employ various grammars, word lists, or the like, to associate part-of-speech indicators with sentence words. Accordingly, in some embodiments, modeling engines may be arranged to leverage the grammar of the conversation language (e.g., English, Spanish, or the like) to evaluate phrases or generate sentence models.

Also, in one or more of the various embodiments, similar to evaluating relationships for conversation graphs, modeling engines may be arranged to enable organization to provide weights, conditions, rules, or the like, via configuration information to account for local requirements or local circumstances associated with determining phrases scores.

In one or more of the various embodiments, if the phrase scores for a sentence may be determined, the phrases may be ranked ordered based on the phrase scores.

Next, in one or more of the various embodiments, control may be returned to a calling process.

Figure 11:
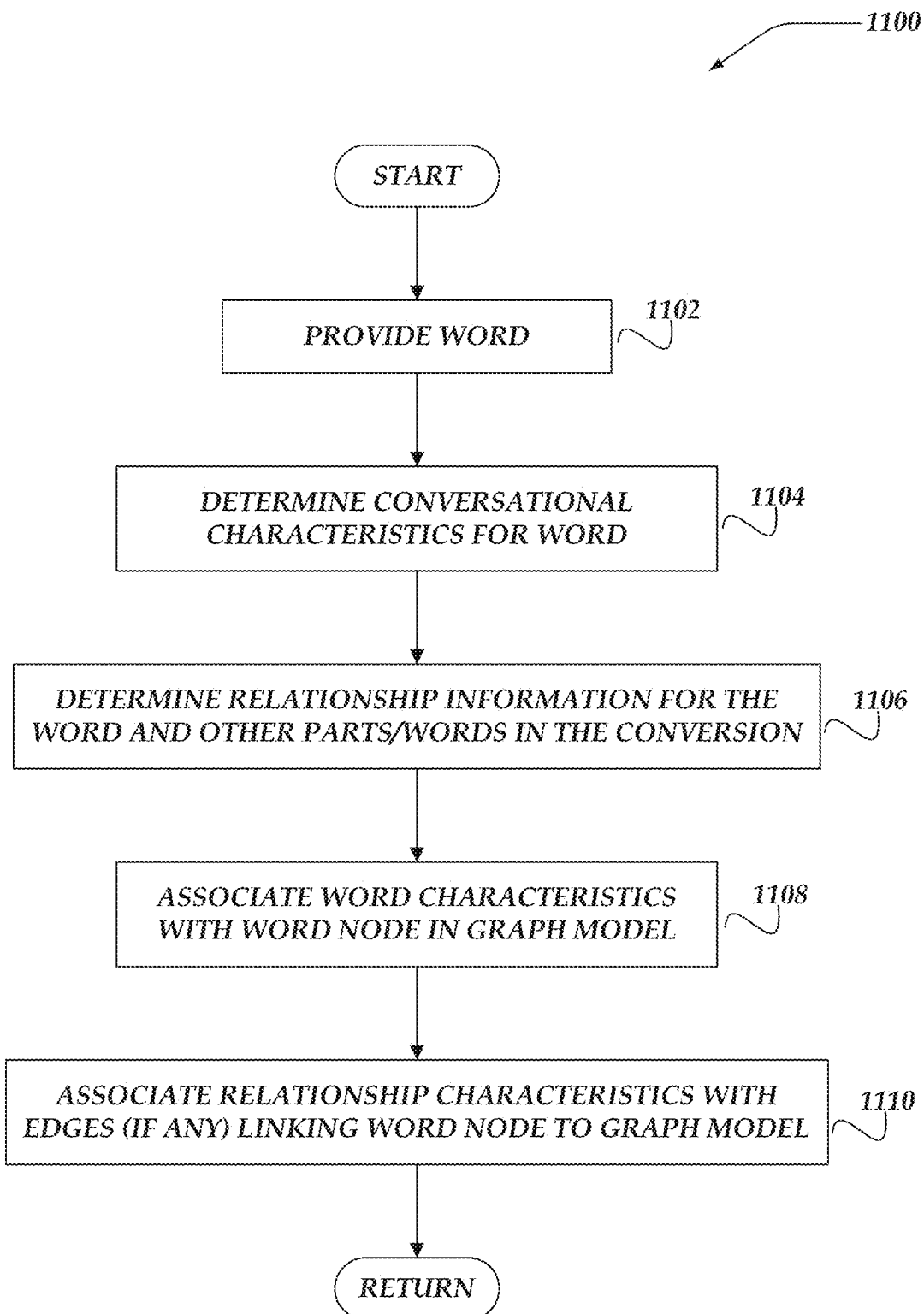
FIG. 11 illustrates a flowchart for a process for generating nodes or edges for a graph model based on conversation words for determining conversational structure from speech in accordance with one or more of the various embodiments.

FIG. 11 illustrates a flowchart for process 1100 for generating nodes or edges for a graph model based on conversation words for determining conversational structure from speech in accordance with one or more of the various embodiments. After a start block, at block 1102, in one or more of the various embodiments, a word may be provided to a modeling engine. After a conversation is converted from voice to text, in some embodiments, individual words from the conversation may be provided to the modeling engine.

At block 1104, in one or more of the various embodiments, the modeling engine may be arranged to determine one or more conversation characteristics for the provided word.

In one or more of the various embodiments, modeling engines may be arranged to discard one or more unimportant words that may be determined from a list, catalog, or dictionary. In some cases, for some embodiment, the discarded words may be referred to as stop words. In some embodiments, modeling engines may be arranged to enable users or organizations to determine some or all of the stop words. Thus, in some embodiments, modeling engines may be arranged to enable users or organizations to define additional unimportant words by adding them to the list of unimportant words. Likewise, in some embodiments, modeling engines may be arranged to enable users or organizations to remove one or more words from the list of unimportant words.

At block 1106, in one or more of the various embodiments, the modeling engine may be arranged to determine relationship information for the provided word and other phrases or words in the conversation. In some embodiments, words that closely follow each other in a conversation may be associated because of their proximity in time. In some embodiments, such words may be assigned an edge to indicate this relationship. Likewise, in some embodiments, modeling engines may be arranged to employ edges to encode various relationships between or among words, such as, co-occurrence (two words appearing together in a sentence), collocation (two words appearing next to each other or separated by a function word), syntactic structure (e.g., the parent and child in a syntactic dependency), lexical similarity (e.g., cosine between the vector representations of two sentences).

At block 1108, in one or more of the various embodiments, the modeling engine may be arranged to associate the one or more word characteristics with the word node in the graph model. In some embodiments, nodes in graph models may correspond to individual words. However, in some embodiments, modeling engines may be arranged to associate characteristics or metrics, such as, word counts, timeline information, indexing information, or the like, with a word by associating them with a node in the graph model that corresponds to the word.

In one or more of the various embodiments, modeling engines may be arranged to associate each word with an array or vector such that each element of the vector corresponds to characteristic or metric of the word. In some embodiments, these characteristics may include the various metrics above, as well as, various word features, such as, part of speech, sentiment information, or the like.

At block 1110, in one or more of the various embodiments, the modeling engine may be arranged to associate one or more relationship characteristics with one or more edges (if any) linking the word node to the graph model.

In one or more of the various embodiments, each type of relationship may be associated with scoring/weighting function that provides a score that may represent the strength or intensity of the relationship. In some embodiments, modeling engines may be arranged to provide partial scores for different types of relationships between words that may be combined to provide a relationship score that encapsulate to combined strength of the one or more types of relationships.

In some embodiments, the particular relationships of interest may vary depending subject matter, user or organization preference, or the like. Also, in some embodiments, relationships may be considered or disregarded for various reasons, such as, compute performance, impact or importance of the relationship, or the like. Accordingly, in some embodiments, modeling engines may be arranged to employ rules, instructions, or the like, provided via configuration information to determine the particular relationships that may be considered or captured for conversation. Likewise, in some embodiments, modeling engines may be arranged to employ rules, formulas, or the like, provided via configuration information to determine how scores or weight values for a given relationship may be determined. For example, in some embodiments, one or more relationships may be associated with a scoring formula that provides continuous scalar results, whereas one or more other relationships may be considered categorical such as it either exists or it does not exist, thus the scoring formula may produce a fixed value if the relationship may be present or a zero or null value if the relationship may be absent.

In some embodiments, modeling engines may be arranged to employ one or more rules or threshold values that may be employed to reject or disregard one or more relationships if the relationship score falls below a defined threshold.

Next, in one or more of the various embodiments, control may be returned to a calling process.

Figure 12:
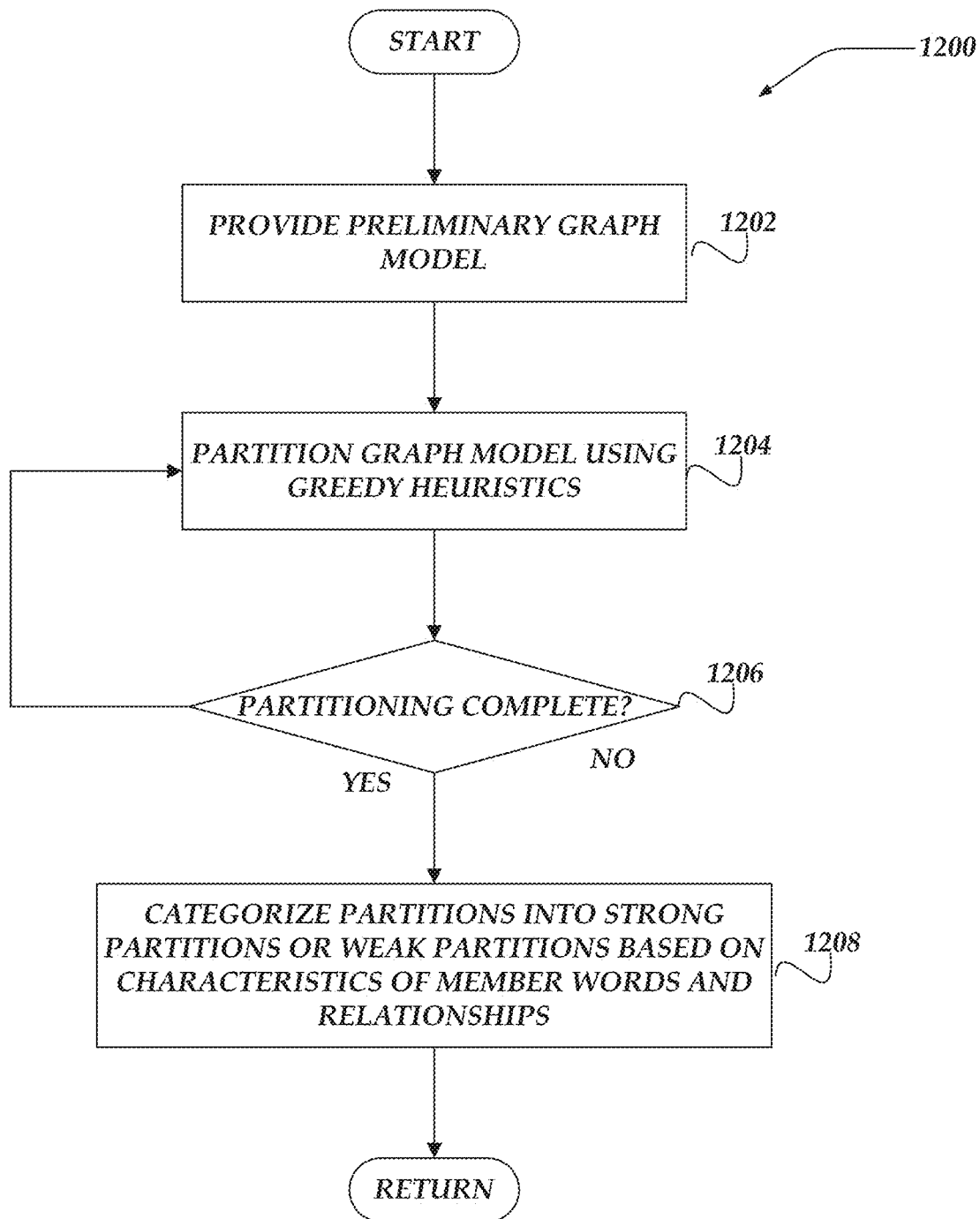
FIG. 12 illustrates a flowchart for a process for partitioning conversation graph models for determining conversational structure from speech in accordance with one or more of the various embodiments.

FIG. 12 illustrates a flowchart for process 1200 for partitioning conversation graph models for determining conversational structure from speech in accordance with one or more of the various embodiments. After a start block, at block 1202, in one or more of the various embodiments, a conversation graph model may be provided to a modeling engine. As described above, in one or more of the various embodiments, modeling engines may be arranged to generate a conversation graph model as words may be provided from a conversation source. In some embodiments, the graph model may represent a snapshot of a pending conversation because the graph model for a conversation may be continuously updated as conversation words may be processed.

At block 1204, in one or more of the various embodiments, the modeling engine may be arranged to partition the graph model using one or more partitioning strategies. In one or more of the various embodiments, partitioning strategies may include one or more rules, heuristics, conditions, classifiers, or the like, that may be employed to partition the conversation graph models into two or more partitions. Accordingly, in some embodiments, conversation words represented by nodes in the graph model may be grouped or clustered based on the partitioning strategy.

In one or more of the various embodiments, partitioning models may be arranged to employ one or more characteristics of the individual word nodes, edges, or the like, to partition the graph model. In some embodiments, the partitioning may be directed towards identifying noise words or noise phrases to separate them from more meaningful portions of the conversation.

In some embodiments, modeling engines may be arranged to employ partition strategies based on one or more conventional or customized graph partitioning methodologies. In some embodiments, the particular methodologies may be determined based on configuration information to account for local requirements or local circumstances. For example, in some embodiments, one or more clustering methodologies may be preferred over another based on available hardware resources, performance requirements, availability of external services, or the like.

For example, in some embodiments, modeling engines may be arranged to employ Louvian community detection to partition the graph model into relevant portions of a conversation from portions of the conversation that may not represent meaningful concepts. Accordingly, in some embodiments, the strength of the relationship between the nodes in the graph model may be employed as a weighting factor for partitioning the graph model. As described above, in some embodiments, modeling engines may be arranged to determine one or more attributes based on the characteristics of the words or conversation that may be employed to compute a strength of relationship for each edge in the graph model. This strength of relationship score may be employed for partitioning the graph model.

At decision block 1206, in one or more of the various embodiments, if the partitioning is complete, control may flow block 1208; otherwise, control may loop back to block 1204.

At block 1208, in one or more of the various embodiments, the modeling engine may be arranged to categorize the one or more partitions into strong partitions or weak partitions based one or more characteristics of the words and the relationships included in the partitions.

In one or more of the various embodiments, modeling engines may be arranged to determine strong partitions based on the number of strongly related words included in the partition. In some embodiments, modeling engines may be arranged to determine the rules, threshold value, parameters, or the like, for distinguishing strong partitions based on configuration information.

In some embodiments, modeling engines may be arranged to iterate over each partition and assign it score representing the strength of the partition. In some embodiments, partitions that include one or more key words or key phrases determined from sentence models may be considered stronger than partitions that may be associated with key words or key phrases included in sentence models.

In some embodiments, one or more partitions may be related to each other based on relationships between words included in the partitions. In some cases, one or more partitions may be unrelated. In some embodiments, partitions may be considered meta-nodes or super-nodes of the conversation graph.

Next, in one or more of the various embodiments, control may be returned to a calling process.

Figure 13:
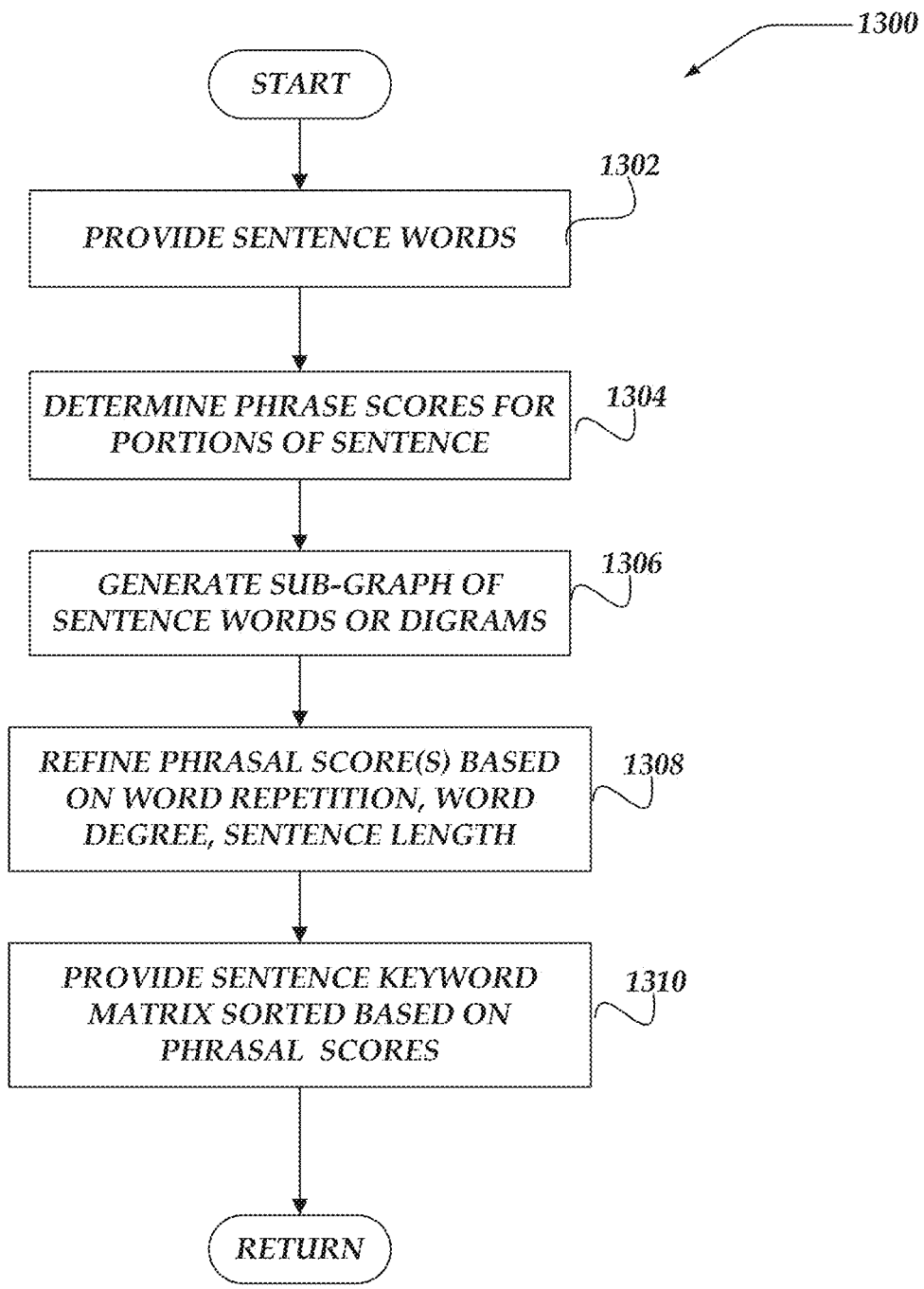
FIG. 13 illustrates a flowchart for a process for generating keyword matrices for sentence models for determining conversational structure from speech in accordance with one or more of the various embodiments.

FIG. 13 illustrates a flowchart for process 1300 for generating keyword matrices for sentence models for determining conversational structure from speech in accordance with one or more of the various embodiments. After a start block, at block 1302, in one or more of the various embodiments, sentence words may be provided to a modeling engine.

In some embodiments, modeling engines may be arranged to monitor the incoming words to determine groups of one or more words that comprise sentences. For example, in one or more of the various embodiments, modeling engines may be arranged to employ natural language processing to determine the conversation words that should be group to provide sentences. Alternatively, in some embodiments, if a speech-to-text service is being used, the speech-to-text service may provide meta-data information, such as, tags, markers, labels, or the like, that may indicate the start or stop of sentences. Further, in some embodiments, entire conversation sentences may be provided via one or more other services that may provide entire sentences. Also, in some embodiments, modeling engines may be arranged to queue or cache incoming conversation words until an entire sentence may be collected.

Note, in some embodiments, processes, such as process 1300 may be arranged to collect sentence words while other processes, such as, process 1100, 1200, or the like, may be concurrently generating or updating conversation graph models, or the like.

In one or more of the various embodiments, modeling engines may be arranged to exclude one or more sentences from modeling. Accordingly, in some cases, one or more sentences may be excluded from this process based on filters or other rules. In some embodiments, the excluded sentences may be sentences that may be recognized or processed using specialized pattern matching, classifiers, or the like. For example, sentences that include acknowledgment phrases, no phrases (e.g., single words), location addresses, phone numbers, or the like, may be automatically excluded from modeling.

At block 1304, in one or more of the various embodiments, modeling engines may be arranged to employ one or more phrase scoring models to determine phrase scores for the diagrams included in a sentence. In some embodiments, phrase scoring models may include one or more rules, heuristics, conditions, classifiers, or the like, that may be employed associate phrase scores with each of the diagrams included conversation sentences. For example, in some embodiments, modeling engines may be arranged to determine phrase scores based on one or more of repetition count of diagrams in a sentence, word degree, length of the diagram scaled based on the word degree of the entire sentence, or the like.

In some embodiments, modeling engines may be arranged to generate phrasal scores based on creating a subgraph of the entire sentence. In some embodiments, the sentence may be split and disconnected by stopwords and contiguous blocks of diagrams may be ranked on one or more features, such as, repetition of the diagrams in the entire sentence, word-degree, length of the entire phrase scaled with respect to the word degree in the entire sentence. In some embodiments, modeling engines may be arranged to determine the particular phrase scoring models to employ based on configuration information.

At block 1306, in one or more of the various embodiments, the modeling engine may be arranged to determine phrase scores for the words included in the sentence based the determined phrase scoring model. In some embodiments, the specific actions performed by the modeling engine may vary depending on the phrase scoring model.

For example, in some embodiments, the modeling engine may be arranged to generate a sub-graph model that represents the one or more sentence words. In some embodiments, stop-words, or the like, may be omitted from consideration. Accordingly, in some embodiments, each diagram in the sentence under consideration may be associated with a node in the sub-graph. Also, in some embodiments, edges may be determined to connect the sub-graph nodes with each based on words that are shared between the different diagrams in the sentence. Note, in some embodiments, modeling engines may be arranged to employ one or more conventional or custom data structures to represent sub-graph or its nodes or edges, such as, arrays, linked lists, tables, matrices, or the like. Next, in some embodiments, a word-degree score may be generated for each diagram based on the number of edges associated with the node representing a given diagram.

At block 1308, in some embodiments, phrase scoring may be further refined by determining a frequency score for each diagram based on the number of times the diagram may be repeated in the same sentence. In some embodiments, the phrase score may be further refined by dividing the word-degree by the frequency score. One of ordinary skill in the art will appreciate that other phrase scoring methodologies may be employed depending on local requirements or local circumstances. For example, in some embodiments, the specialized hardware support, or the like, may dictate that other phrase scoring techniques may be employed. Likewise, in some embodiments, two or more phrase scoring models may be employed such that their performance may be compared or evaluated against each other.

In one or more of the various embodiments, sentence words may be processed as pairs (e.g., word diagrams) to determine phrase scores for each diagram in the sentence. In some embodiments, modeling engines may be arranged to exempt or exclude one or more words that may be determined to provide little or no semantic value. In some embodiments, the particular words that may be excluded from the phrase scoring process may vary depending on the natural language, organizational preferences, user preferences, problem domain considerations, or the like. Accordingly, in some embodiments, modeling engines may be arranged to employ rules, dictionaries, catalogs, taxonomies, ontologies, parsers, grammars, or the like, that may be provided or based on configuration information to account for local requirements or local circumstances. For example, in some embodiments, words, such as, 'the', 'of', 'be', 'is', or the like, may be excluded from some or all portions of the phrase scoring. However, in some embodiments, modeling engines may be arranged to employ or consider the exempt words while evaluating other phrases. For example, in some embodiments, if phrase scoring includes total word count or length of a sentence, in some embodiments, the exempt words may be included. Further, in some embodiments, some or all of the exempt words may be considered stop words that may be defined as a list or collection of stop words.

In one or more of the various embodiments, modeling engines may be arranged to identify subjects and objects in the sub-graph. In some embodiment, modeling engines may be arranged to associate candidate phrases with the subject and object using the left and right child of the verb associated with the main subject of the sentence. In some embodiments, modeling engines may be arranged to search for matching subject/object pairs in conversation graph partitions and associate a partition with each subject/object pair.

At block 1310, in one or more of the various embodiments, the modeling engine may be arranged to provide one or more sentence keywords rank ordered based on the phrase scores.

Further, in some embodiments, modeling engines may be arranged to include the combination of partition words and keywords, such as, [p1_word, p2_word] [key word], [p1_word, p2_word] [key word], or the like, in sentence models.

Figure 14:
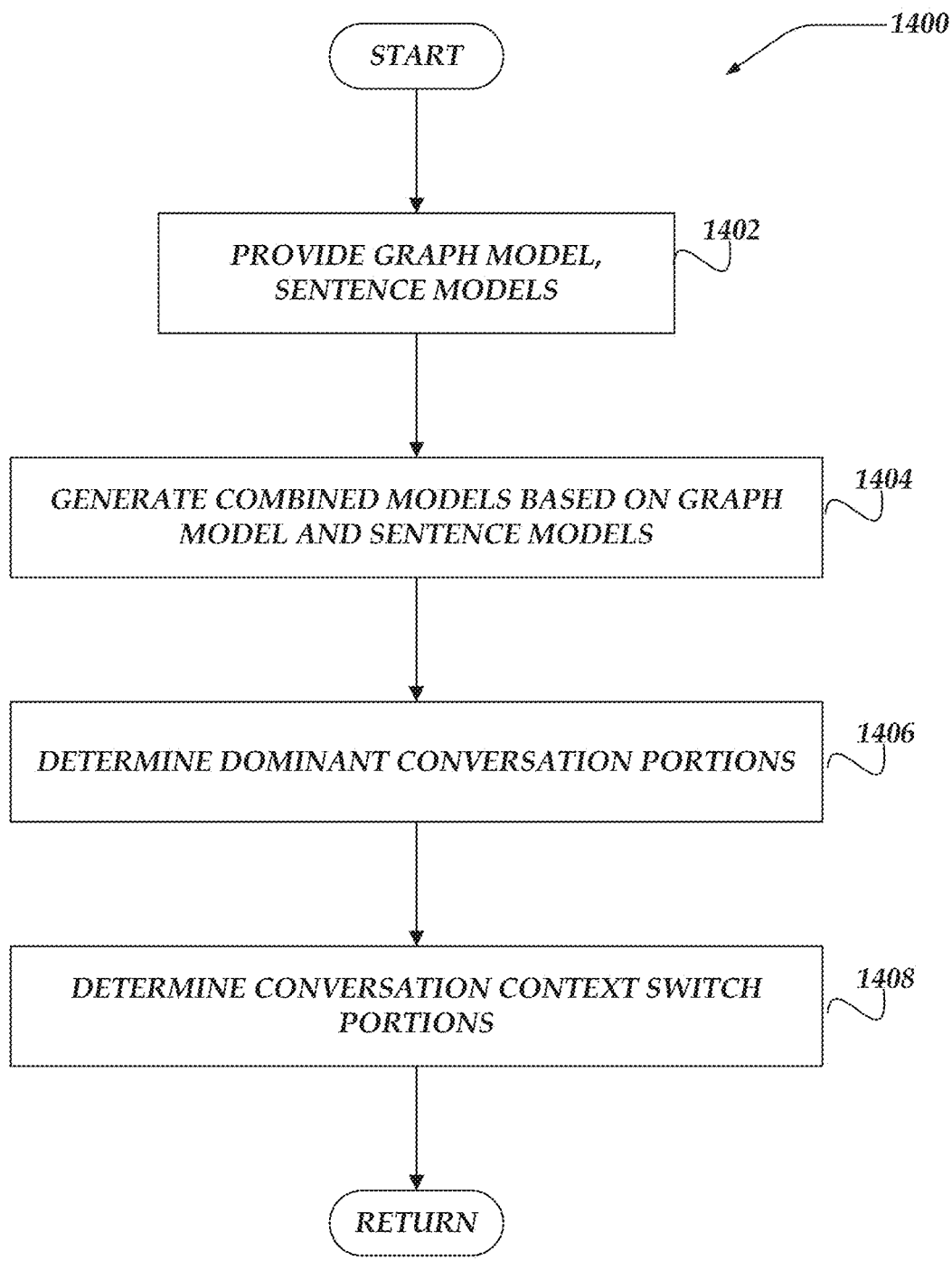
FIG. 14 illustrates a flowchart for a process for generating combined model matrices for determining conversational structure from speech in accordance with one or more of the various embodiments.

FIG. 14 illustrates a flowchart for process 1400 for generating combined model matrices for determining conversational structure from speech in accordance with one or more of the various embodiments. After a start block, at block 1402, in one or more of the various embodiments, one or more sentence models, and a graph model may be provided to a modeling engine. As described above, in some embodiments, modeling engines may be arranged to generate or determine one or more key phrases, one or more sentence models, and a graph model that represents the features or characteristics of a conversation. In some embodiments, modeling engines may be provided references or identifiers that may be employed to lookup or retrieve one or more data structures that may represent the one or more key phrases, one or more sentence models, or the graph model.

At block 1404, in one or more of the various embodiments, the modeling engine may be arranged to generate a combined model for the conversation based on sentence models and the graph model. Accordingly, in some embodiments, the modeling engines may be arranged to employ the combined model to generate a conversation digest that may be used to trace topic transitions in the flow of the conversation.

In one or more of the various embodiments, combined models may include records or attributes that may be associated with time-line information. Accordingly, the time-line information may be employed to associate information from the one or more key phrases, the one or more sentence models, or partitions of the graph model with their corresponding position in the conversation. For example, key phrases determined from sentence models may be associated with conversation partitions that correspond to the same time/portion of the conversation. For example, in some embodiments, modeling engines may be arranged to generate matrices that combine the information from sentence models and conversation partitions where the rows of the matrices may correspond to the time-line position of the conversations and columns in the matrices may correspond to attribute values associated with the one or more key phrases, the one or more sentence models, or the graph model partitions.

In one or more of the various embodiments, modeling engines may be arranged to map key phrases in sentence models to partitions by iterating through the rank ordered key phrases in sentence models to determine the partitions they may be strongly correlated with. In some embodiments, modeling engines may be arranged employ one or more methods to determine the correlation strength. Thus, in some embodiments, the rules or features for determining the correlations may be modified or customized depending on local requirements or local circumstances. For example, in some embodiments, modeling engines may be arranged to combine the partitions from the graph model and the sentence models into multi-dimensional matrices. In some embodiments, these matrices may be reduced by conventional decomposition, or the like. And, in this example, eigen vectors of the decomposed matrices may be determined. Thus, in this example, modeling engines may be arranged to determine the strength of the correlation between key phrases in sentences and the conversation partitions based on their associated eigen values.

In one or more of the various embodiments, modeling engines may generate combined models by combining a representation of the graph model (the partitions) and the sentence models into one combined model. In some embodiments, modeling engines may be arranged to represent combined models using matrix data structures.

At block 1406, in one or more of the various embodiments, the modeling engine may be arranged to determine one or more dominant conversation portions based on the combined model. In some embodiments, modeling engines may be arranged to employ the combined model to determine the partitions that are strongly associated with key phrases from the sentence models.

In one or more of the various embodiments, partitions that may be strongly associated with key phrases in sentence models may be determined to be dominant portions of the conversation.

In one or more of the various embodiments, modeling engines may be arranged to represent the importance of each word or phrase in a partition using a distribution curve such that the peak of the curve may correspond to the contextual importance of words or words in partitions.

At block 1408, in one or more of the various embodiments, the modeling engine may be arranged to determine one or more conversation context switch portions of the conversation based on the one or more key-phrases, one or more word nodes, one or more sentence models, or the like. In some embodiments, modeling engines may be arranged to determine context switch portions of the conversations based on evaluating the dips/crests in the distribution curves included in a conversation digest.

In one or more of the various embodiments, modeling engines may be arranged to evaluate one or more characteristics of the contextual importance curves to determine where a dominant portion of the conversation ends and another begins. For example, in some embodiments, modeling engines may be arranged evaluate the maximum value, minimum values, rate of change, direction of change, rolling averages, or the like, of a the distribution curves associated with a portion of a conversation to determine if the subject/context of the conversation may be shifting.

In one or more of the various embodiments, a conversation digest (See, conversation digest 412 in FIG. 4) may be generated based on the dominant portions of the conversation and the non-dominant portions that may link the dominant portions of the conversation together. In some embodiments, non-dominant portions of the conversation may be considered context transitions that represent how the conversation transitions from topic to another.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Operations for Determining Context Switches in Conversations

In one or more of the various embodiments, modeling engines may be arranged to execute one or more of the below actions or operations in support of one or more innovations for determining conversational structure from speech. In one or more of the various embodiments, at least some of the operational described below may be performed in parallel. Moreover, some or all of the actions or operations may be performed across more than one processor, such as might arise in a multi-processor computer system. In addition, one or more actions or operations described below may be performed concurrently with other actions or operations or combinations of actions or operations, or even in a different sequence than illustrated without departing from the scope or spirit of the invention.

As described above, in one or more of the various embodiments, modeling engines may be arranged to generate sentence models from individual sentences into sentence models. Additional details for processing sentences are described below.

In one or more of the various embodiments, a first part of the process may include parsing each sentence into dependency tree.

In one or more of the various embodiments, a next part of the process may include: identifying the subjects and objects of the sentence from the dependency tree; associate candidate phrases to the subject and object using the left and right child of the verb associated with the main subject; search for matched subject/objects in the partition list from the conversation graph and associate a partition identifier with the sentence. In some embodiments, modeling engines may be arranged to represent a sentence in sentence models as combination of partition elements, such as:

[$p1\_word$,$p2\_word$] [keyWord]

[$p1\_word$,$p2\_word$] [keyWord]

In one or more of the various embodiments, modeling engines may be arranged to parse sentences from the conversation within context windows by performing one or more actions including: establishing a context window size; beginning with the first chunk a starting sentence may be determined and labeled J; the end of first chunk may be starting position plus the context windows size. In some embodiments, modeling engines may be arranged to provide a default context windows size that organizations or users may modify via configuration information. For example, in some embodiments, a modeling engine may be arranged to have a default context windows size of seven.

In one or more of the various embodiments, after the initialization of the first chunk (as determined by the context window size, the first chunk and the remainder of chunks may be processed by performing one or more actions including: removing sentences such as acknowledgements, addresses, sentences with no phrases, or the like (noise reduction); remaining (non-excluded) sentences may be individually processed to provide corresponding sentence models as described above.

Accordingly, in some embodiments, modeling engines may be arranged to iterate over the conversation in steps based on the size of the context window across the entire conversation to create a matrix of the following structure:

$$W*(\text{PartitionMatrix})\alpha(\text{ContextWindow})=\text{Keywords}$$

Thus, in some embodiments, modeling engines may be arranged to provide the entire conversation in the form of a noiseless reduction in terms of interacting components of the conversation graph and the keywords (or keyphrases) in the sentences. As described above, this enables a linkage between the conversation graph (or partitions), keywords, and locations in the conversation.

In some embodiments, the conversation may be represented as a partition matrix that represents the entire conversation expressed in terms of partitions and the resultant keywords. In some embodiments, the rows of the partition matrix may represent the context windows that may be combined to form the matrix, and the columns may represent combined partitions.

In one or more of the various embodiments, modeling engines may be arranged to perform one or more actions to generate eigen vectors from the partition matrix to support one or more operations for determining conversational structure from speech. To enable efficient determination of the interactions, the keywords in the matrix may be replaced by placeholder real numbers to enable to computation of the eigen vectors. Accordingly, in some embodiments, each text string in the matrix may be replaced by a unique positive integer to enable the generation of eigen vectors that may represent the hierarchical movements of the individual partition words across different directions within the conversation. In some embodiments, modeling engines may be arranged to provide one or more indexes or other data structures to preserve/record the mapping of key words to numbers used to represent the key words in the partition matrix.

In one or more of the various embodiments, modeling engines may be arranged to compute eigen vectors. In some embodiments, one or more conventional linear algebra techniques may be employed to compute eigen vectors. In some embodiments, because the partition matrix may be arranged to be a definite positive matrix optimizations, such as, Chelosky decomposition may be employed to reduce the complexity of the operations required to provide the eigen vectors and associated eigen values. Accordingly, in some embodiments, modeling engines may be arranged to perform actions, including: computing the eigen vectors; determining a damping factor from configuration information (e.g., 0.75, or the like); the resultant matrix vocab size may be assigned to match the number of partitions determined from the conversation graph; data structures for the positive definite adjacency matrix may be initialized such that its dimensions may be based on the number of partitions and its columns may be based on the number of sentences models; the modeling engines may generate the adjacency metrics using (i,j) vocab pairs and associated interaction matrices.

In some embodiments, modeling engines may be arranged to create adjacency matrix pairs based on normalized symmetric pairs. In some embodiments, the matrix pairs may be positive definite matrix pairs. For example, in some embodiments, modeling engines may be arranged to execute an operation, such as, Adj*Transpose(Adj−diagonal(A[diagonal]). Also, for example, the matrix pairs may be normalized based on the columns.

In one or more of the various embodiments, modeling engines may be arranged to apply a linear transformation to the adjacency matrix that iteratively applies the formula below:

$$\text{EigenValue}[\text{step}[i]]=(1-\text{damping factor})+d*\text{Dot}(g*\text{Eigen}(\text{step}[i]-1)$$

In some embodiments, modeling engines may employ a convergence limit threshold to determine to end to the iterative computation. In some embodiments, modeling engines may be arranged to determine the convergence limit threshold value via configuration to account for local requirements or local circumstances. For example, in some embodiments, modeling engines may determine the convergence limit threshold value to be $1e*10^{-5}$.

Accordingly, as the linear transformation converges, the modeling engines may be arranged to extract eigenvalues. In one or more of the various embodiments, the nodes of the words in the conversation may be ranked based on their associated eigenvalues. Note, in this example, eigenvalues may be considered to rank partitions of the entire conversation by their inter-linkage to other nodes present in the conversation. In one or more of the various embodiments, if the eigenvalues may be extracted, the eigen-vectors from the linear transformation decomposition matrix may be rank ordered.

In some embodiments, modeling engines may be arranged to map the eigenvectors to key phrases of the partitions to associate a ranking score with the key phrases. Accordingly, in some embodiments, modeling engines may be arranged to perform actions, such as: determining if key phrases may be present in the decomposition matrix described above for generating eigenvalues. If the key phrase may be in the decomposition matrix, the key phrase may be associated with the corresponding eigen value; otherwise, the score for the key phrases may be based on an average value of the eigenvalue associated with the eigen of maximum intersection with the nearest pairs that may be present in the decomposition matrix.

In one or more of the various embodiments, modeling engines may be arranged to generate a combined model based on the partition combination matrix, the keywords, the score for the key phrase, or the like. Accordingly, in some embodiments, data structures representing the combined model may be considered a matrix that includes one or more columns, such as, the partition combinations, keywords, scores, or the like.

In some embodiments, modeling engines may be arranged to employ the combined model (matrix) to determine the dominant portions of the conversation. In some embodiments, modeling engines may be arranged to determine one or more of dominant topics, sub-topics (topics), or key phrases in the conversation that may be included a conversation digest.

Accordingly, in some embodiments, modeling engines may be arranged to track a pattern of repetition of the dominant eigen vectors and how they contribute to shifts in the scores associated with the key phrases in the conversation as determined above.

In one or more of the various embodiments, modeling engines may be arranged to perform one or more actions that track a pattern of repetition of the eigenvectors in the combined model in a localized way that associates the localized tracking information with sequential temporary blocks. Accordingly, in some embodiments, modeling engines may be arranged to perform one or more actions for each partition combination in the combined model, including: initializing data structures for the temporary block with starting parameters that may include a partition combination, a score, start time (location in the conversions), the key phrases associated with the partition combination; determine if a partition included in the current partition combination may be included in other partition combinations that may be below and before an occurrence of a dominant partition, if so, and the partition combinations are found, group above other combination in the temporary chunk; alternatively, if a conflicting dominant partition is discovered, modeling engines may be arranged to determine closeness scores for the conflicting dominant partitions based on the conversation graph associating the partition with the closer dominant partition; appending word combinations to temporary block; update an average score of associated with the temporary block based on the average scores of its associated word combinations; advance the end time associated with the temporary block; or the like. In some embodiments, the temporary block may be closed and added to a block collection if combinations associated with a next dominant chunk may be determined; if the current temporary block is closed, a next temporary block may initialized and the process may continue. Accordingly, in one or more of the various embodiments, modeling engines may be arranged to segment the conversation into separate temporary blocks appended into a list of chunks of that include one or more non-separable chunks comprising a conversation digest for the conversation.

What is claimed as new and desired to be protected by Letters Patent of the United States is:

1. A method for organizing conversations over a network using one or more network computers that include one or more processors that perform actions, comprising:
    employing a conversation stream of words to generate a graph model for a conversation of one or more of words;
    generating one or more sentence models based on the graph model, wherein the one or more sentence models provide one or more key phrases and one or more sentences based on the one or more words;
    generating a combined model based on the one or more sentence models and the graph model to provide one or more associations between one or more portions of the conversation stream with the one or more key phrases and one or more partitions of the graph model; and
    determining one or more of topics or sub-topics in the conversation based on the one or more associations.

2. The method of claim 1, further comprising:
    employing the combined model to determine an amount of dominance by each portion of the conversation stream based on a strength of the one or more associations between the one or more key phrases and the one or more partitions of the graph model.

3. The method of claim 1, wherein determining the one or more of topics or sub-topics in the conversation, further comprises:
    determining one or more context switches in the conversation based on an amount of dominance by each portion of the conversation stream, wherein the one or more context switches are employed to identify the one or more of topics or sub-topics.

4. The method of claim 1, further comprising:
    categorizing the one or more partitions by one or more types based on one or more of characteristics or relationships for each word that is included in a partition.

5. The method of claim 1, further comprising:
    determining one or more values for a phrase for one or more portions of each sentence;
    modifying the one or more values for each sentence based on one or more of a repetition of each word, a degree of each word, or a length of each sentence; and
    employing the one or more modified values to order one or more key words for the conversation.

6. The method of claim 1, further comprising:
    determining a transition from a first portion to a second portion of the conversation stream based on an amount of dominance associated with the first portion and another amount of dominance associated with the second portion.

7. The method of claim 1, wherein the conversation stream of words, further comprises, providing the one or more words from one or more of a live conversation, a recorded conversation, a live video, a recorded video, or a transcription of the conversation; and
    converting speech in an audio portion of the live conversation, the recorded conversation, the live video, or the recorded video into text based on natural language processing.

8. A system for organizing conversation information over a network, comprising:
    a network computer, comprising:
        a memory that stores at least instructions; and
        one or more processors that execute instructions that enable performance of actions, including:
            employing a conversation stream of words to generate a graph model for a conversation of one or more of words;
            generating one or more sentence models based on the graph model, wherein the one or more sentence models provide one or more key phrases and one or more sentences based on the one or more words;
            generating a combined model based on the one or more sentence models and the graph model to provide one or more associations between one or more portions of the conversation stream with the one or more key phrases and one or more partitions of the graph model; and
            determining one or more of topics or sub-topics in the conversation based on the one or more associations.

9. The system of claim 8, further comprising:
    employing the combined model to determine an amount of dominance by each portion of the conversation stream based on a strength of the one or more associations between the one or more key phrases and the one or more partitions of the graph model.

10. The system of claim 8, wherein determining the one or more of topics or sub-topics in the conversation, further comprises:
    determining one or more context switches in the conversation based on an amount of dominance by each portion of the conversation stream, wherein the one or more context switches are employed to identify the one or more of topics or sub-topics.

11. The system of claim 8, further comprising:
categorizing the one or more partitions by one or more types based on one or more of characteristics or relationships for each word that is included in a partition.

12. The system of claim 8, further comprising:
determining one or more values for a phrase for one or more portions of each sentence;
modifying the one or more values for each sentence based on one or more of a repetition of each word, a degree of each word, or a length of each sentence; and
employing the one or more modified values to order one or more key words for the conversation.

13. The system of claim 8, further comprising:
determining a transition from a first portion to a second portion of the conversation stream based on an amount of dominance associated with the first portion and another amount of dominance associated with the second portion.

14. The system of claim 8, wherein the conversation stream of words, further comprises, providing the one or more words from one or more of a live conversation, a recorded conversation, a live video, a recorded video, or a transcription of the conversation; and
converting speech in an audio portion of the live conversation, the recorded conversation, the live video, or the recorded video into text based on natural language processing.

15. A processor readable non-transitory storage media that includes instructions for organizing conversation information over a network, wherein execution of the instructions by one or more hardware processors enable performance of actions, comprising:
employing a conversation stream of words to generate a graph model for a conversation of one or more of words;
generating one or more sentence models based on the graph model, wherein the one or more sentence models provide one or more key phrases and one or more sentences based on the one or more words;
generating a combined model based on the one or more sentence models and the graph model to provide one or more associations between one or more portions of the conversation stream with the one or more key phrases and one or more partitions of the graph model; and
determining one or more of topics or sub-topics in the conversation based on the one or more associations.

16. The processor readable non-transitory storage media of claim 15, further comprising:
employing the combined model to determine an amount of dominance by each portion of the conversation stream based on a strength of the one or more associations between the one or more key phrases and the one or more partitions of the graph model.

17. The processor readable non-transitory storage media of claim 15, wherein determining the one or more of topics or sub-topics in the conversation, further comprises:
determining one or more context switches in the conversation based on an amount of dominance by each portion of the conversation stream, wherein the one or more context switches are employed to identify the one or more of topics or sub-topics.

18. The processor readable non-transitory storage media of claim 15, further comprising:
categorizing the one or more partitions by one or more types based on one or more of characteristics or relationships for each word that is included in a partition.

19. The processor readable non-transitory storage media of claim 15, further comprising:
determining one or more values for a phrase for one or more portions of each sentence;
modifying the one or more values for each sentence based on one or more of a repetition of each word, a degree of each word, or a length of each sentence; and
employing the one or more modified values to order one or more key words for the conversation.

20. The processor readable non-transitory storage media of claim 15, further comprising:
determining a transition from a first portion to a second portion of the conversation stream based on an amount of dominance associated with the first portion and another amount of dominance associated with the second portion.

* * * * *